US012298830B1

(12) United States Patent
Whitehouse et al.

(10) Patent No.: US 12,298,830 B1
(45) Date of Patent: May 13, 2025

(54) PRESENCE DETECTION THROUGH RADIO FREQUENCY EMISSIONS FROM AN ELECTRICAL CIRCUIT

(71) Applicant: Amazon Technologies, Inc., Seattle, WA (US)

(72) Inventors: Cameron Dean Whitehouse, Seattle, WA (US); Matthew Liang Chaboud, San Francisco, CA (US); Arielle Rachel Bertman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 5 days.

(21) Appl. No.: 17/480,033

(22) Filed: Sep. 20, 2021

Related U.S. Application Data

(63) Continuation of application No. 16/126,638, filed on Sep. 10, 2018, now Pat. No. 11,126,244.

(51) Int. Cl.
| | | |
|---|---|---|
| *G06F 1/3231* | (2019.01) | |
| *G06F 1/18* | (2006.01) | |
| *H01R 13/04* | (2006.01) | |
| *H01R 13/66* | (2006.01) | |

(52) U.S. Cl.
CPC ............ *G06F 1/3231* (2013.01); *G06F 1/188* (2013.01); *H01R 13/04* (2013.01); *H01R 13/6683* (2013.01)

(58) Field of Classification Search
None
See application file for complete search history.

(56) References Cited

U.S. PATENT DOCUMENTS

| | | |
|---|---|---|
| 6,700,333 B1 | 3/2004 | Hirshi et al. |
| 8,131,497 B2 | 3/2012 | Steinberg et al. |
| 8,244,405 B2 | 8/2012 | Kao et al. |
| 8,423,322 B2 | 4/2013 | Steinberg et al. |
| 8,498,753 B2 | 7/2013 | Steinberg et al. |
| 9,146,548 B2 | 9/2015 | Chambers et al. |
| 10,018,371 B2 | 7/2018 | Steinberg et al. |
| 10,373,234 B2 | 8/2019 | Depew |

(Continued)

FOREIGN PATENT DOCUMENTS

WO     2010103332 A1     9/2010

OTHER PUBLICATIONS

Blackford, J., "The Future of Computing: For 500,000 Years Technology has Advanced While People Remained the Same. In the next Millennium, the Human Race Plays Catch-Up," Computer Shopper, 19(12) 319, retrieved from https://dialog.proquest.com/professional/docview/668855858?accountid=142257, 1999.

(Continued)

*Primary Examiner* — Nasima Monsur
(74) *Attorney, Agent, or Firm* — Athorus, PLLC

(57) ABSTRACT

Described implementations utilize existing power lines at a location to detect and monitor the presence, position, and/or identity of users at the location. Rather than requiring dedicated monitors within each room or position within the location, the described implementations monitor a baseline voltage signal and/or an introduced voltage signal on the ground line of an existing power line of the location to determine the presence, position, and/or identity of a user at the location, either alone or in combination with other information.

20 Claims, 15 Drawing Sheets

(56) References Cited

U.S. PATENT DOCUMENTS

| | | | |
|---|---|---|---|
| 2006/0133465 A1* | 6/2006 | Dockemeyer, Jr. | H04B 3/542 375/220 |
| 2006/0151529 A1 | 7/2006 | Crisp | |
| 2009/0230950 A1 | 9/2009 | Czarnecki | |
| 2010/0079132 A1 | 4/2010 | Steele et al. | |
| 2011/0176598 A1* | 7/2011 | Kohout | H04W 24/04 375/227 |
| 2012/0058775 A1* | 3/2012 | Dupray | G01S 5/0258 455/456.1 |
| 2012/0092502 A1* | 4/2012 | Knasel | H04N 7/18 340/565 |
| 2012/0302092 A1 | 11/2012 | Kaps et al. | |
| 2013/0041605 A1 | 2/2013 | Ting et al. | |
| 2013/0127248 A1 | 5/2013 | Lai | |
| 2013/0132008 A1 | 5/2013 | Borean et al. | |
| 2013/0254151 A1 | 9/2013 | Mohagheghi et al. | |
| 2014/0136348 A1 | 5/2014 | Carroll et al. | |
| 2014/0177737 A1 | 6/2014 | Vasquez et al. | |
| 2014/0225603 A1* | 8/2014 | Auguste | G01R 21/133 324/244 |
| 2014/0333322 A1 | 11/2014 | Kabler et al. | |
| 2015/0039391 A1 | 2/2015 | Hershkovitz et al. | |
| 2015/0077243 A1 | 3/2015 | Hooper et al. | |
| 2015/0253364 A1 | 9/2015 | Hieda et al. | |
| 2017/0078845 A1* | 3/2017 | Wootton | H04L 67/10 |
| 2018/0070253 A1* | 3/2018 | Kleinbeck | H04B 17/318 |
| 2018/0080970 A1 | 3/2018 | Kraus et al. | |
| 2018/0262262 A1* | 9/2018 | Byrne | H02J 50/50 |
| 2020/0003659 A1 | 1/2020 | Davies et al. | |
| 2020/0149981 A1 | 5/2020 | Koeppl et al. | |

OTHER PUBLICATIONS

International Search Report and Written Opinion mailed Sep. 8, 2015 for International Application No. PCT/ US2015/036018, 11 pages.

P3 International, "Kill A Watt," P3 International Corporation, Copyright 2014 http://www.p3international.com/products/p4400. html (downloaded Jun. 27, 2014, by web.archive.org), 1 page.

* cited by examiner

PRESENCE DETECTION THROUGH RADIO FREQUENCY EMISSIONS FROM AN ELECTRICAL CIRCUIT

PRIOR CLAIM

This application is a Continuation of U.S. patent application Ser. No. 16/126,638, Filed Sep. 10, 2018, and titled Power Line Presence Detection, the contents of which are herein incorporated by reference in their entirety.

BACKGROUND

People typically use power supplied from power systems, provided using power grids, to light buildings, to heat and cool homes, and to enable operation of devices (computers, televisions, kitchen appliances, etc.). There is a price for power.

As homes and other locations become more autonomous and more connected, attempts have been made to monitor and/or control the amount of energy consumed by various devices at those locations and/or to detect presence of users at those locations. However, existing presence detection systems rely on dedicated monitors at positions or rooms within the location to detect the presence or movement of users at the location.

BRIEF DESCRIPTION OF DRAWINGS

The detailed description is described with reference to the accompanying figures.

DETAILED DESCRIPTION

Figure 1:
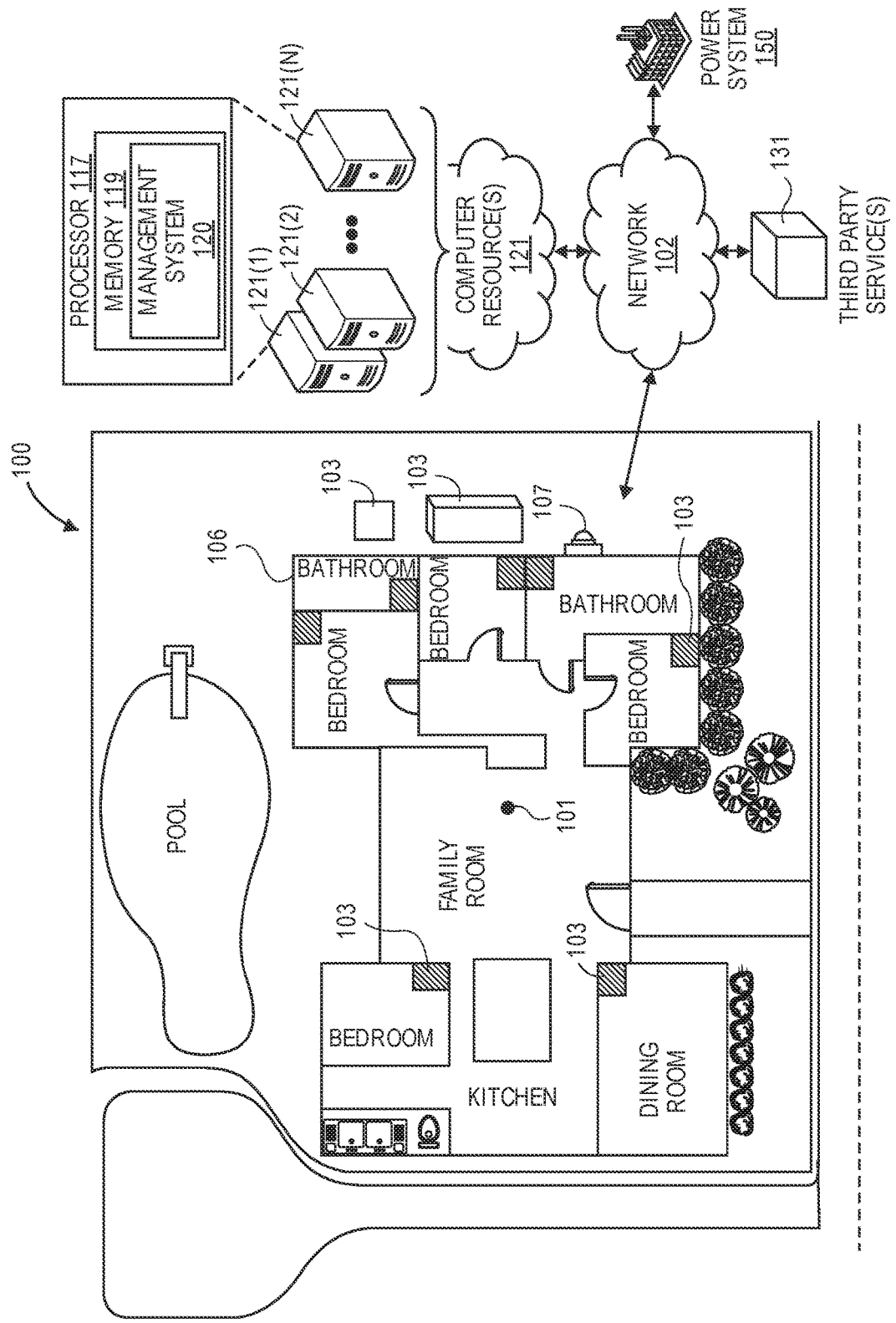
FIG. 1 is a block diagram of a location for which power line presence detection is to be performed to determine the presence, position, and/or identity of a user at the location, in accordance with described implementations.

Described are systems, methods, and apparatus that utilize existing power lines at a location to detect and monitor the presence, position, and/or identity of users at the location. Rather than requiring dedicated monitors within each room or position within the location, the described implementations monitor a baseline voltage signal and/or an introduced voltage signal introduced on any one or more of a positive line, neutral line, and/or ground line of an existing power line at the location to determine the presence, position, and/or identity of a user at the location, either alone or in combination with other information. For example, when a user physically contacts a device at the location that is connected to power, there is a perturbation of at least one of the voltage, frequency, amplitude, or shape of the signal on the ground line and/or introduced signal on the ground line that is detectable due to the contact between the user and the device. As one specific example, when a user grasps the metal handle of a refrigerator door, opens a microwave door, etc., such physical contact with the device causes a detectable change (perturbation) of the voltage signal on the ground line and/or a perturbation of an introduced voltage signal on the ground line at the location. This change occurs primarily because the device is coupled to safety ground of the power lines and when the user, who is also grounded, physically contacts the device, the signal on the ground line changes.

In some implementations, the presence of the user may be detected by transmitting a signal, such as a radio frequency ("RF") signal, on one of the positive line, neutral line, or ground line, receiving the signal with the ground line and/or a receiver, such as an RF receiver, determining a signal characteristic vector representative of the received signal, and signal characteristic vector is different than a stored or baseline signal characteristic vector for the location and/or a position (e.g., room) within the location. If a user is present, the signal will reflect off the user and change the signal characteristic vector for the signal, thereby indicating presence of the user at the location or at a position at the location.

In still some other implementations, the presence or position of a user may be detected based on a capacitive coupling between a device at the location and the user, when the user is physically near the device (e.g., within twenty-four inches) but not necessarily touching the device. For example, a plug-in sensor, as discussed herein, may be incorporated into a device and operable to transform the device into an L-C (inductance-capacitance) circuit to detect the presence of a user. In such a configuration, the user acts as the grounded plate with the ground on which the user is standing of a variable capacitor of the L-C circuit. When the user approaches the device, the presence of the user is detected by the L-C circuit as a result of the capacitive coupling and the distance between the user and the device determined. In another example, the plug-in sensor may be separate from the device and, through introduction of a signal on the ground line, detect the presence of a user when the user approaches the device and causes a capacitive coupling with the device.

In still other examples, detected perturbation from a user physically contacting a device, the signal characteristic vector from a transmitted signal, and/or the detected presence of a user from a device operating as an L-C circuit may be used together and/or with other inputs to determine the presence, position, and/or identity of a user at a location. Such information may then be utilized to automate other tasks, alter the state of one or more devices at the location, refine or improve speech processing, etc.

Utilizing presence, position, and/or identity detection over existing power lines/electrical system of a location by simply plugging the plug-in sensor into any electrical outlet, as discussed further below, provides an improvement over existing presence detection systems. For example, the disclosed implementations may be installed by any consumer and do not require professional installation, do not require dedicated monitoring components at specific positions at the location, etc., and utilize existing power lines at the location to detect the presence, position, and/or identity of users at the location In some implementations, the determined presence, position, and/or identity of a user may be used to perform one or more actions at the location. For example, when existing systems determine that a user is entering the kitchen (a position) of a location, one or more devices, such as lights, may be instructed to automatically change states (e.g., lights may transition from an off state to an on state). In other implementations, the determined presence, position, and/or identity of the user may be used to improve or refine one or more speech processing techniques, such as natural language understanding ("NLU") processing, automatic speech recognition ("ASR") processing, query parsing, etc. For example, the position, identity, or device contacted or otherwise interacted with by a user may be used to refine or reduce potential understandings or determinations from the speech processing.

FIG. 1 is a block diagram of a location 100 for which user presence, position, and/or identity within a location is to be determined and/or monitored, in accordance with described implementations. In this example, the location is a home location that includes a structure 106 in the form of a personal residence. It will be appreciated that the location and corresponding structure may be any location or structure for which user presence, position, and/or identity is to be determined or monitored with the described implementations. For example, the location may be residential, business, commercial, public, etc. Likewise, the structure may be a personal residence, apartment, office building, government building, municipal building, entertainment facility (e.g., coliseum, stadium), shopping facility, etc.

One or more plug-in sensors 101 may be positioned at the location by simply plugging in the plug-in sensor into any electrical outlet at the location 100. In some implementations, two plug-in sensors 101 may be utilized at the location, one monitoring each phase of a two-phase power supply at the location. In other implementations, only a single plug-in sensor may be utilized. In still other examples, a different plug-in sensor may be inserted into a plug along each branch or circuit at the location.

Likewise, each location includes one or more devices 103 that consume variable amounts of energy based on their usage. The devices 103 may be internal or inside the structure 106, or external or outside the structure 106, and may provide various functions. In some implementations, the devices may be configured to communicate with a communication component to either receive operation instructions and/or to provide usage information.

As discussed herein, in some implementations, upon installation, the plug-in sensor monitors for voltage changes on the ground line of an existing electrical circuit, also referred to herein as a power line, at the location and, extracts from a baseline voltage for the location, detected voltage changes (e.g., perturbation). For example, a location in the United States may receive 120 volts (RMS) at 60 Hertz ("Hz") frequency, which represents a baseline that is known for the plug-in sensor. The plug-in sensor may then monitor for voltage changes at the location by comparing the baseline from actual voltage measurements at the location. A detected difference on the ground line may be representative of a user physically contacting a device that is powered by the electrical system—thereby providing an indication of user presence at the location.

The plug-in sensor 101, in some implementations, may also introduce a known load, such a resistive load, an inductive load, or a capacitive load, on the ground line of the existing circuit at the location and monitor for changes as a result of the introduced load. Load introduction may be performed when the plug-in sensor is first connected to the circuit to aid in determining the topology and/or characteristics of the circuit at the location and/or to detect perturbation of the introduced load in response to a user physically contacting an electrically connected device at the location. In other examples, the load may be continually introduced and used to monitor for changes on the ground line (perturbation).

The location may also include a power meter 107 that measures the amount of energy consumed at the location. In some implementations, the power meter 107 may include a wireless component that transmits energy consumption data at periodic intervals and/or that may be polled and, in response to a poll, provide energy consumption data. In such an implementation, the energy consumption data may be obtained locally from the power meter 107 by the plug-in sensor and/or by another component at the location (e.g., communication hub) and used to determine the amount of energy consumed by a device during operation of that device or during a particular operating state of the device.

The system may also include computing resource(s) 121. The computing resource(s) 121 may be remote from the location 100. Likewise, the computing resource(s) 121 may be configured to communicate over a network 102 with the location 100, the plug-in sensor 101, and/or the devices 103. Likewise, the computing resource(s) 121 may communicate over the network 102 with one or more power systems 150, and/or one or more third party service(s) 131.

As illustrated, the computing resource(s) 121 may be implemented as one or more servers 121(1), 121(2), . . . , 121(N) and may, in some instances, form a portion of a network-accessible computing platform implemented as a computing infrastructure of processors, storage, software, data access, and so forth that is maintained and accessible by components/devices of the system via a network 102, such as an intranet (e.g., local area network), the Internet, etc. The computing resources 121 may process data received from plug-in sensor 101, data from third parties 131 and/or data from the power system 150 to determine devices in operation at the location, energy consumed by those devices when operating at the location 100, the presence/absence of a user at the location, the position of users at the location, and/or the identity of a user at the location.

The server system(s) 121 does not require end-agent knowledge of the physical location and configuration of the system that delivers the services. Common expressions associated for these remote computing resource(s) 121 include "on-demand computing," "software as a service (SaaS)," "platform computing," "network-accessible platform," "cloud services," "data centers," and so forth. Each of the servers 121(1)-(N) include a processor 117 and memory 119, which may store or otherwise have access to a management system 120, as described herein.

The network 102, and each of the other networks discussed herein, may utilize wired technologies (e.g., wires, USB, fiber optic cable, etc.), wireless technologies (e.g., radio frequency, infrared, NFC, cellular, satellite, Bluetooth, etc.), or other connection technologies. The network 102 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

As will be appreciated, a user or agent utilizing the described implementations may be provided with and has the option to, at any time, opt-in to share information with the computing systems and/or to have some, all, or different amounts of information collected or measured by the herein described implementations. At any time, a user may selected what information is collected or maintained and may likewise select, at any time, to have some or all of any such information deleted or otherwise destroyed.

Figure 2:
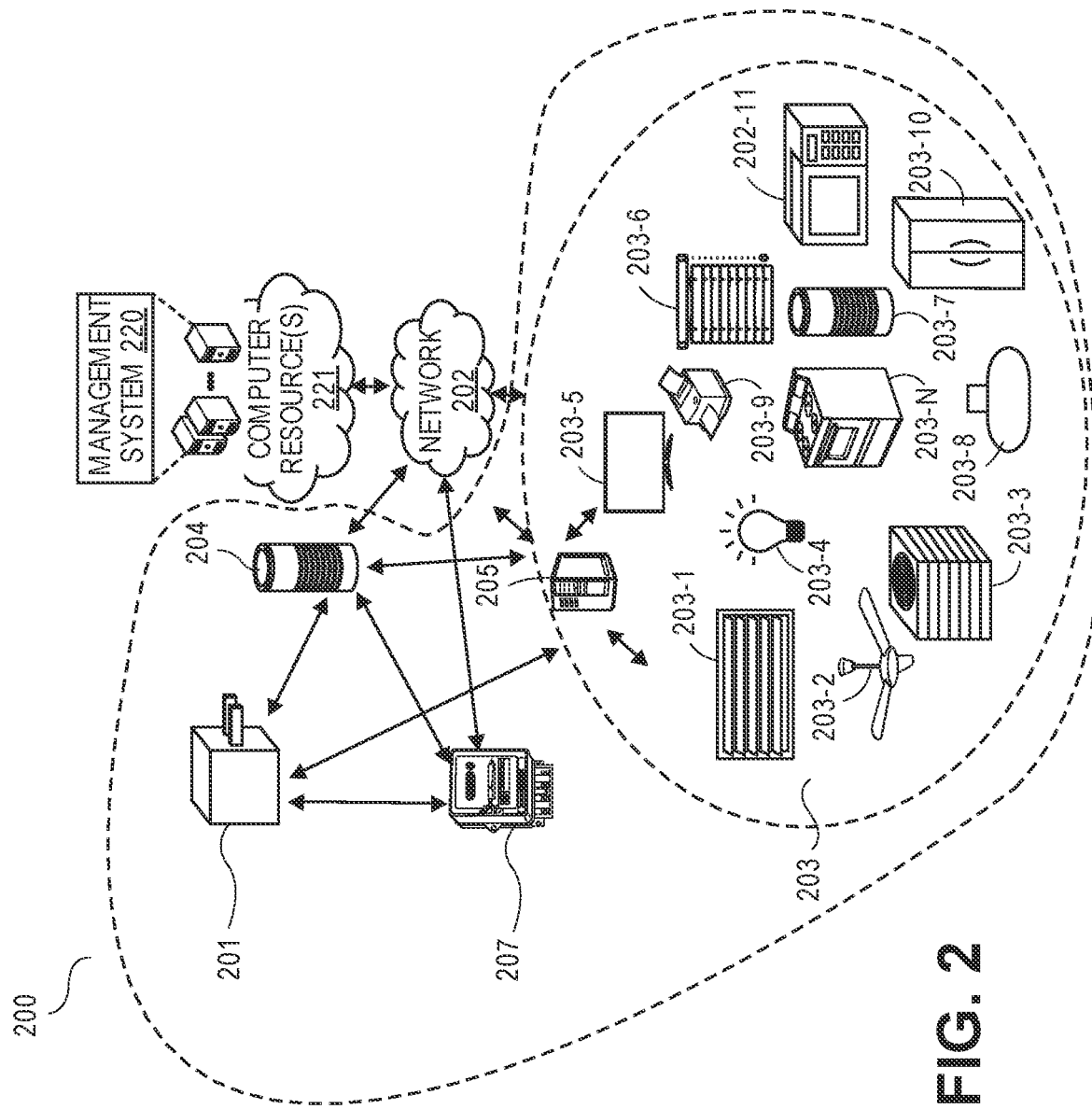
FIG. 2 illustrates a plug-in sensor and devices of the location illustrated in FIG. 1 and the communication paths with the remote management systems, in accordance with described implementations.

FIG. 2 illustrates additional details of a plug-in sensor 201, devices 203, and remote management system 220 illustrated in FIG. 1 and the communication paths therebetween, in accordance with described implementations. Example hardware configurations of the plug-in sensor 201 are discussed further below with respect to FIG. 11. In some implementations, the plug-in sensor 201 may be a stand-alone device that may be plugged into any electrical outlet at the location. In other examples, the plug-in sensor 201 may be incorporated into a device 203 and/or included as part of a communication component 204.

The plug-in sensor 201 may by powered by the electrical system at the location, by battery power, and/or powered from other devices or components. For example, the plug-in sensor 201 may harvest power from the electrical outlet into which it is installed.

In addition to collecting data, the plug-in sensor 201 may be configured to communicate with devices 203, a power meter 207 at the location, and/or a communication component 204 that is also positioned within the location. For example, the plug-in sensor 201 may include a wireless transmitter/receiver that is operable to connect to a wireless network 202 and provide received data to other devices and/or the communication component via the wireless network. In other implementations, the plug-in sensor 201 may be configured to transmit data, such as detected data, reflection data (discussed below), device state changes, user detection, user position, user identity, and/or device identifiers, to other components, such as the communication component 204 via the electrical circuit at the location.

Any form of wired and/or wireless communication may be utilized to facilitate communication between the devices and/or sensors. For example, any one or more of 802.15.4 (ZIGBEE), 802.11 (WI-FI), 802.16 (WiMAX), BLUETOOTH, Z-WAVE, near field communication ("NFC"), etc., may be used to communicate between the devices and one or more sensors.

Devices 203 at a location may include any one or more items that consume energy during operation. Devices may include, but are not limited to adjustable vents 203-1, ceiling fans 203-2, HVAC 203-3, lights 203-4, televisions 203-5, window blinds 203-6, pool pumps or heaters 203-7, hot water heaters 203-8, office equipment, such as computers or printers 203-9, kitchen appliances, such as refrigerators 203-10 and microwaves 203-11, and/or other electrically powered devices 203-N. In some implementations, the devices may be connected devices capable of receiving instructions, referred to herein as command data, from the management system 220, via a communication hub 205, via the communication component 204, and/or directly. In other implementations, one or more devices may not be connected and may only be controllable by either a user at the location and/or by controlling the circuit that provides power to the device.

Connected devices 203 are configured to receive and execute instructions included in command data sent from the management system 220 operating on a remote computing resource directly, via the hub 205 that is positioned at the location, and/or via the communication component that is positioned at the location. Likewise, in some implementations, the devices may be further configured to transmit or send operational information (e.g., energy consumption, errors, etc.) to the management system, the plug-in sensor, and/or the communication component 204.

In some implementations, the communication hub 205 may forward data received from the plug-in sensor 201 to the management system for processing by the management system 220 and/or forward command data received from the management system 220 to various devices 203 for execution. In other implementations, some or all of the processing of the voltage data may be performed by the communication hub 205. For example, the communication hub 205 may receive data from the plug-in sensor 201 and compare the received data with stored baseline data for the location to determine presence at the location.

While the described implementation discusses a communication hub 205 and a communication component 204 as distinct components, in some implementations, the operation and functions described herein may be performed entirely by one or both of the communication hub 205 or the communication component 204. Accordingly, the use of the terms communication hub 205 and communication component 204 may, in some implementations, be utilized interchangeably.

Regardless of whether data is processed at the plug-in sensor 201, the communication hub 205, the remote computing system 221, and/or some combination thereof, based on a change in the voltage data (e.g., perturbation), a presence of a user may be detected at the location, a position of the detected user may be determined and, in some implementations, the identity of the user may be determined. For example, as discussed further below, the plug-in sensor 201 and/or the communication hub 205 at the location may maintain in a memory, stored baseline signal data for the location. As signal data is measured on the ground line, the signal data may be subtracted from the stored baseline signal data to determine if there is a change in the signal data, the change representative of a user at the location that has physically contacted a powered device at the location. If a change in the signal data is detected, it may be confirmed that a user is present at the location.

In some implementations, the detected change may be considered with other inputs at the location to determine the position of the user within the location. For example, if a change in the baseline signal data measured on the ground line of the electrical system at the location is detected, such detection may be considered in conjunction with inputs indicating state changes of one or more devices at the location. For example, if the inputs of a refrigerator light activating (state change) and the refrigerator compressor activating (state change), it may be determined that the user is positioned near the refrigerator at the location and is in physical contact with the refrigerator—e.g., grasping the metal door handle of the refrigerator.

In some implementations, as discussed further below, the plug-in sensor may also introduce a signal, such as an RF signal, on one or more of the positive line, neutral line, or ground line of the electrical circuit and then measure the introduced signal. Such measurement may be, for example, a time offset from transmission of the signal to receipt of the same reflected signal, a spectral attenuation of the signal, etc. A time offset and the frequency may be used to determine a distance to an object off which the signal reflected. The distance may then be subtracted from a stored distance for the location, or a position/room at the location, to determine presence and/or position of a user at the location. For example, a signal may be introduced on a branch of the electrical circuit that provides electricity to specific rooms at the location and the computed distance based on a measured time offset for the signal compared with a stored baseline distance for that branch. If there is a difference, it may be determined that a user is present at the location in the position of the location covered by that branch of the electrical circuit. In another example, a spectral attenuation of the introduced signal may be measured and compared with a stored spectral attenuation of the signal that was measured when it was known there were no users at the location to determine if a difference exists, such a difference representative of a change at the location.

Time offset and distance determination, spectral attenuation, etc., are collectively referred to herein as signal characteristic vectors. A signal characteristic vector may include any one or more characteristics of a transmitted signal that received after transmission, referred to herein as an affected signal.

In still other examples, the plug-in sensor may be included in a device and the device, or a portion thereof, may operate as a L-C circuit to determine if a user is within a detectable distance of the device. If the user is detected, the plug-in sensor may utilize that data as the determined position of the user within the location. For example, the plug-in sensor may be included in a device and when a user gets physically close to the device, the user functions as a ground plate for the capacitor of the L-C circuit and a capacitive coupling occurs. The plug-in sensor detects the capacitive coupling and the detection is indicative of a user that is in close proximity (e.g., within twenty-four inches) of the device.

In some implementations, additional information from other devices at the location may also be utilized by the plug-in sensor 201, the communication hub 204 and/or the management system 220 to determine user presence, the position of a detected user within the location, and/or an identity of the user. For example, information received from one or more connected devices may be used to limit or identify candidate devices that the user may have physically contacted and/or to remove from consideration devices that are known to not have been contacted by the user. Likewise, sensors at the location may be used to assist in device determination, user position determination, and/or user identification. For example, a light or motion sensor may provide data indicating whether a person is moving in areas of the location and/or whether lights are on/off within areas of the location. As another example, image data and/or other information, such as device identification of a device in the possession of a user, may be used to determine a user profile associated with the device that is representative of the user.

Figure 3:
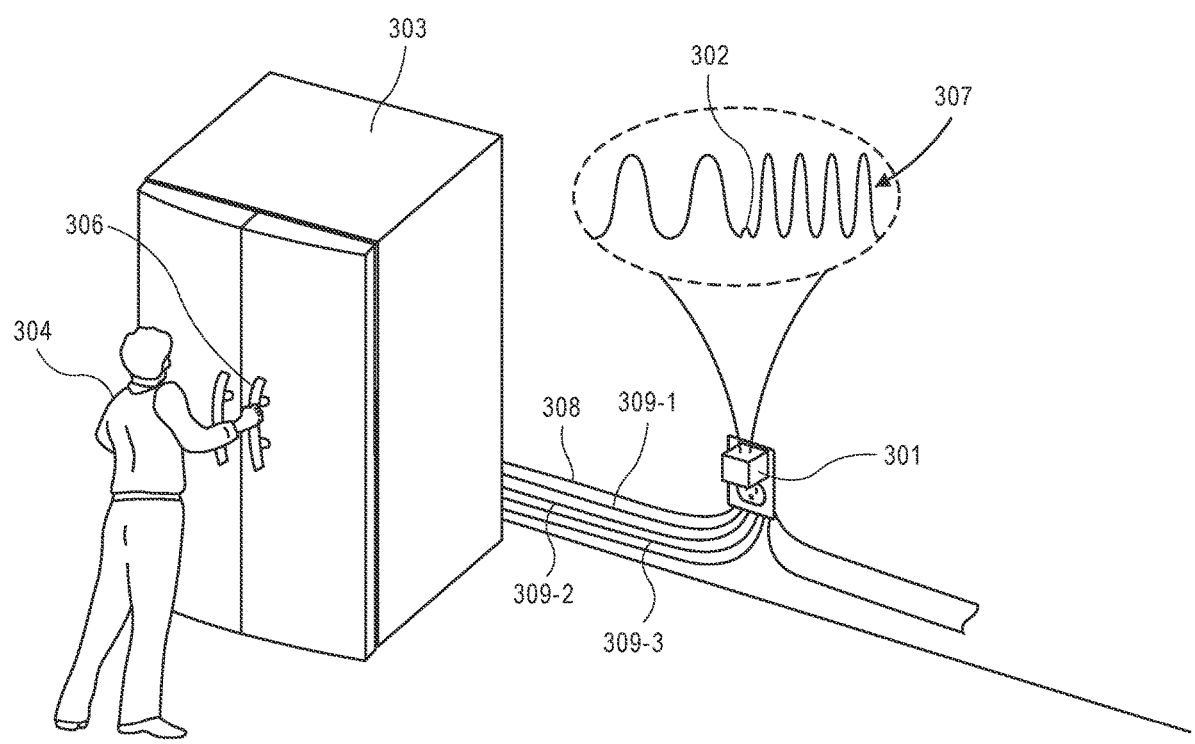
FIG. 3 illustrates a power line presence detection based on a detected contact between a user and a powered device at the location, in accordance with described implementations.

FIG. 3 illustrates a power line presence detection based on a detected contact between a user and a powered device at the location, in accordance with described implementations. In the illustrated example, a user 304 has physically contacted a device 303, in this example a refrigerator, by grasping the metal handle 306 of the device. The device 303 is electrically connected to the electrical circuit via the power line 308. The power line 308 includes a positive line 309-1 or positive wire, a neutral line 309-2 or neutral wire, and a ground line 309-3 or ground wire.

In many instances, the device and metal components of the device are coupled to the ground line 309-3, also known as a safety ground. As a result of this safety grounding of the device, when a user physically contacts a metal portion of the device, the conductivity of the user results in a change in the signal present on the ground line 309-3, also referred to herein as a perturbation of the ground line signal.

By installing a plug-in sensor 301 somewhere on the electrical circuit of the location, the ground line signal may be measured by the plug-in sensor as a difference between the ground line and a reference point. Because ground lines on different branches of an electrical circuit are generally coupled together at a breaker box, the plug-in sensor 301 may be positioned anywhere along the electrical circuit of the location and detect changes in the ground line signal. When the user physically contacts a device 303, a change in the ground line signal is detected by the plug-in sensor 301, thereby indicating a presence of the user at the location.

In some implementations, to enhance detection, the plug-in sensor 301 may introduce a load, such as a uniform sine wave 307 onto the ground line and then measure the sine wave on the ground line to detect changes in the sine wave as a result of a user 304 physically contacting a device 303. In this example, referring to the expanded view of the sine wave 307, a perturbation 302 is indicated in the sine wave that is measured by the plug-in sensor in response to the user physically contacting the device 303 by grasping the metal handle of the device 303.

In some implementations, the change in the ground line signal may be unique to the user, unique to the device, and/or unique to the combination of the user and the device. For example, a first user at the location may produce a first change to the ground line signal when the first user physically contacts the device 303 at the location and a second user may produce a second change to the ground line signal when the second user physically contacts the device 303. In such an implementation, the unique signals may be associated with the user and utilized by the plug-in sensor 301 when other changes to the ground line signal are detected. For example, a stored ground line signal, also referred to herein as a stored signature, may be compared to a measured ground line signal change and if the two signals are substantially similar, the identity of the user profile may be detected as the user that physically contacted the device.

Different changes to the ground line signal may be due to the different conductance of different individuals, different heights, different body weights, different body compositions, etc. In still other examples, as discussed further below, other signals, such as signals from a device carried by the user, may be utilized in conjunction with the measured change in the ground line signal to determine the presence, location, and/or identity of the user.

By using ground line signal measurements, the presence of a user in a location may be determined through the simple addition of a plug-in sensor at any electrical outlet of the electrical circuit at the location. Such detection presents a technical improvement over existing presence detection systems that require sensors positions throughout the location that monitor for the presence or absence of a user.

Figure 4:
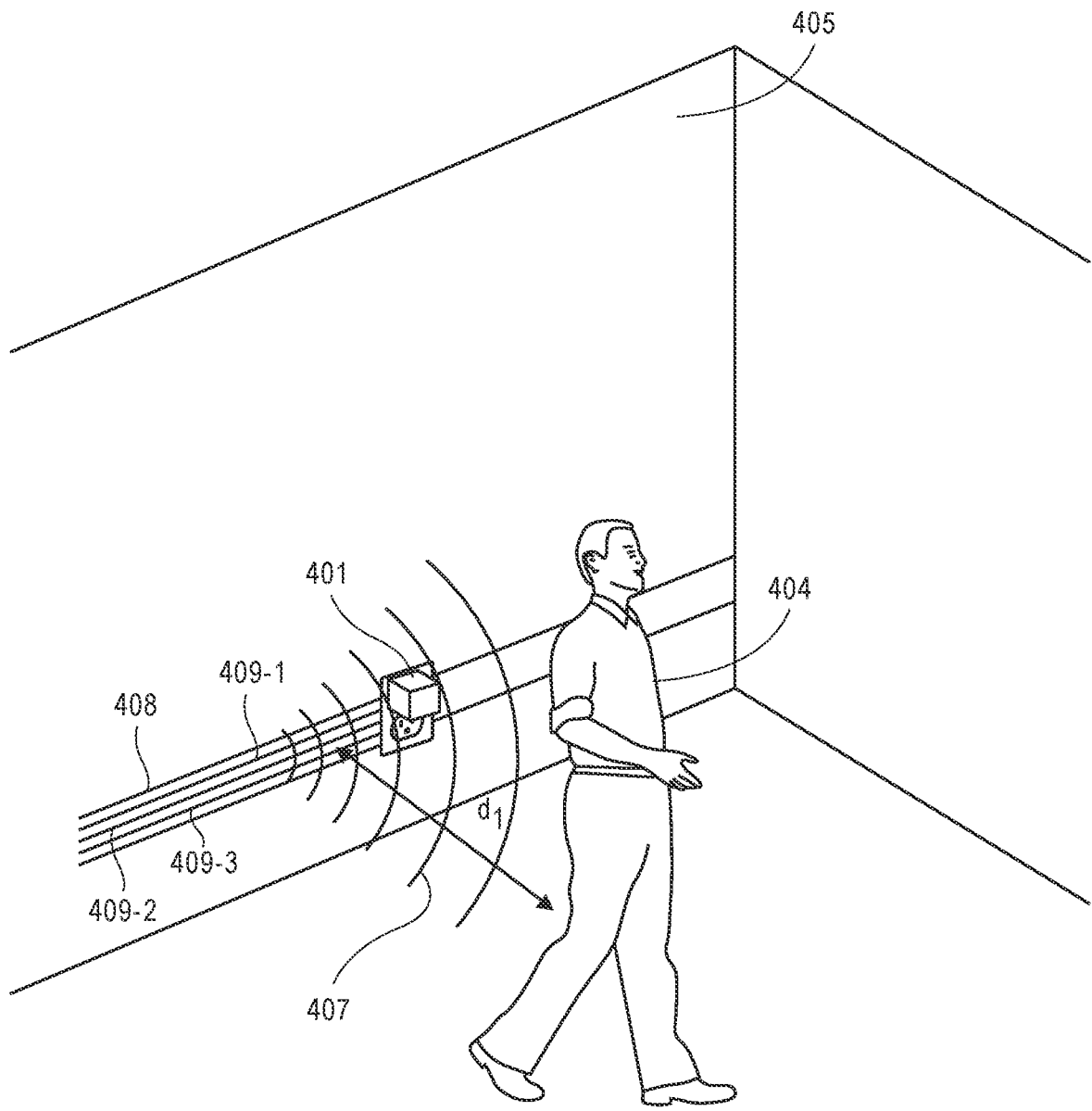
FIG. 4 illustrates a power line presence detection based on a transmitted signal, such as a radio frequency signal, transmitted from a power line at the location, in accordance with described implementations.

FIG. 4 illustrates a power line presence detection based on transmitted signals, such as RF signals, transmitted from a power line at the location, in accordance with described implementations. In this example, the plug-in sensor 401, which may be connected anywhere in the electrical circuit, includes an electrical signal transmitter that transmits into the power line 408 one or more signals 407 that are emitted from the power line 408 into the location. In some implementations, the plug-in sensor may transition between emitting varying frequencies of signals, such as different low frequency signals. Likewise, the signals may be transmitted/emitted from any one or more of the positive line 409-1, neutral line 409-2, or the ground line 409-3. The power line may be any existing power line at the location, such as in-wall 405 or in-ceiling power lines.

A receiver, which may be the power line or an electrical signal receiver of the plug-in sensor, is then used to detect or measure the transmitted signal after it reflects off a surface, such as a user 404. The reflected or measured signal is referred to herein as the affected signal. A time offset is then computed as the difference between the time of transmission of the signal and the receipt or detection of the reflected signal. Based on the frequency of the signal and the determined time offset, the distance between the transmitter/receiver and the object off which the signal reflected may be determined. As another example, the electrical signal receiver may measure a spectral attenuation of the transmitted signal. The measured spectral attenuation may then be compared to a stored spectral attenuation that was measured when no users are present at the location. If a difference is determined, such a difference may be representative of a user present at the location. Regardless of which one or more techniques are used, a signal characteristic vector of the affected signal is determined and, as discussed below, may be compared with a stored or baseline signal characteristic vector to determine if a user is present at the location.

As discussed below, a baseline distance to objects at different positions may be determined and stored for the location, or for various positions or rooms within the location. Likewise, a baseline spectral attenuation for different signals may be measured and stored for the location, or for various positions or rooms within the location. As different signals 407 are transmitted, the resulting signal characteristic vector may be compared to the stored signal characteristic vector to determine if an object, such as a user 404, is present or moving within the location, or at a position within the location.

While existing systems may use signal characteristic vectors to determine distances to and/or present of objects, the existing system presents a technical improvement through the use of existing, in wall 405, power lines 408 that effectively form a large antenna that may be used to detect users throughout any portion of the location and/or in different rooms of the location. Antennas of existing systems are small by comparison and are specific to those devices, rather than already incorporated into the location/building.

Figure 5:
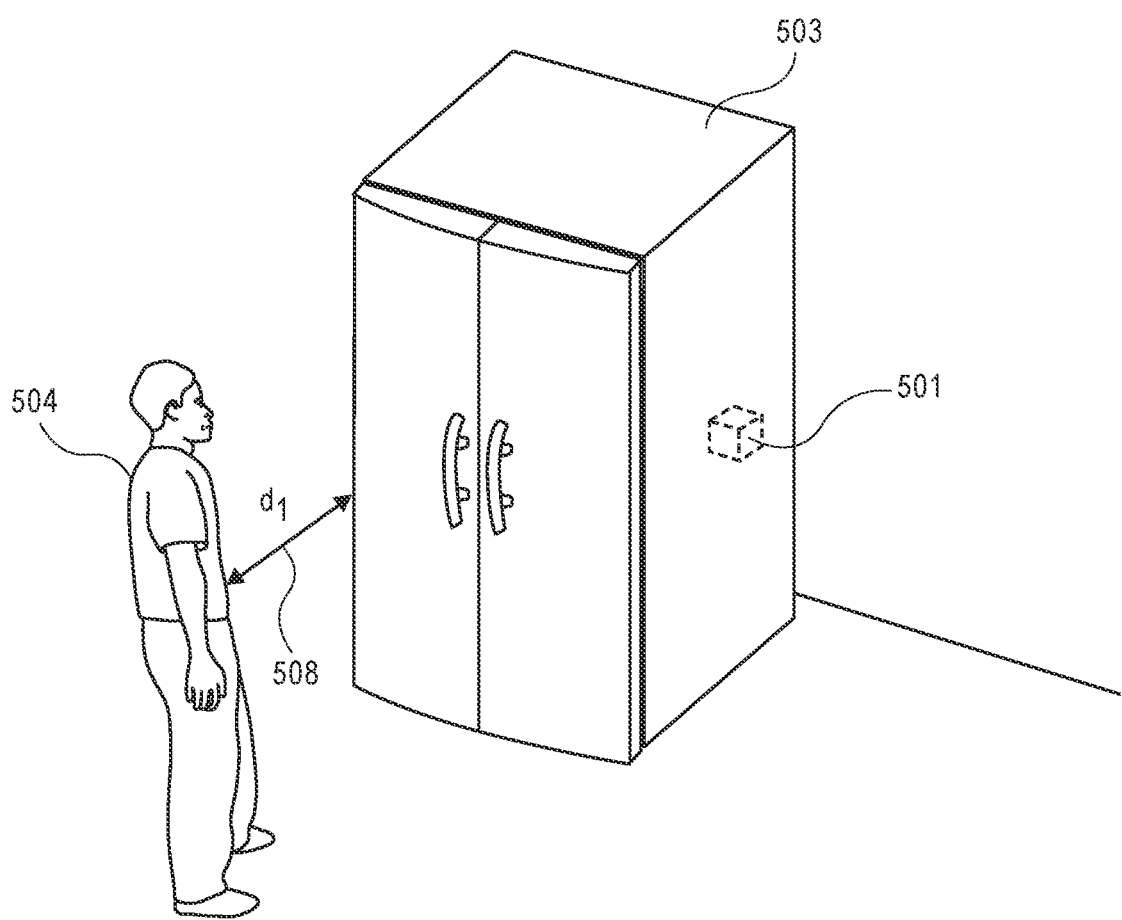
FIG. 5 is another power line presence detection based on a capacitive coupling between a powered device at the location and a user, in accordance with described implementations.

FIG. 5 is another power line presence detection based on a capacitive coupling between a powered device at the location and a user, in accordance with described implementations. In FIG. 5, the plug-in sensor 501 utilizes capacitive coupling to determine when the user is physically close but not necessary touching a device 503. In this example, the plug-in sensor is included as part of the device 503. In other implementations, the plug-in sensor 501 may be separate from the device. Regardless of the position of the plug-in sensor 501, the plug-in sensor may introduce a load on the ground line to which the device 500 is connected. When a user 504 is within a detectable distance 508 (e.g., twenty-four inches) of the device, the proximity of the user to the device, in combination with the introduced load, cause a capacitive coupling. Specifically, the user 504 functions as the ground plate of a capacitor of an L-C circuit and a capacitive coupling occurs between the inductor and the capacitor. This capacitive coupling is detectable by the plug-in sensor and used to detect the presence of a user adjacent the device 503.

Figure 6:
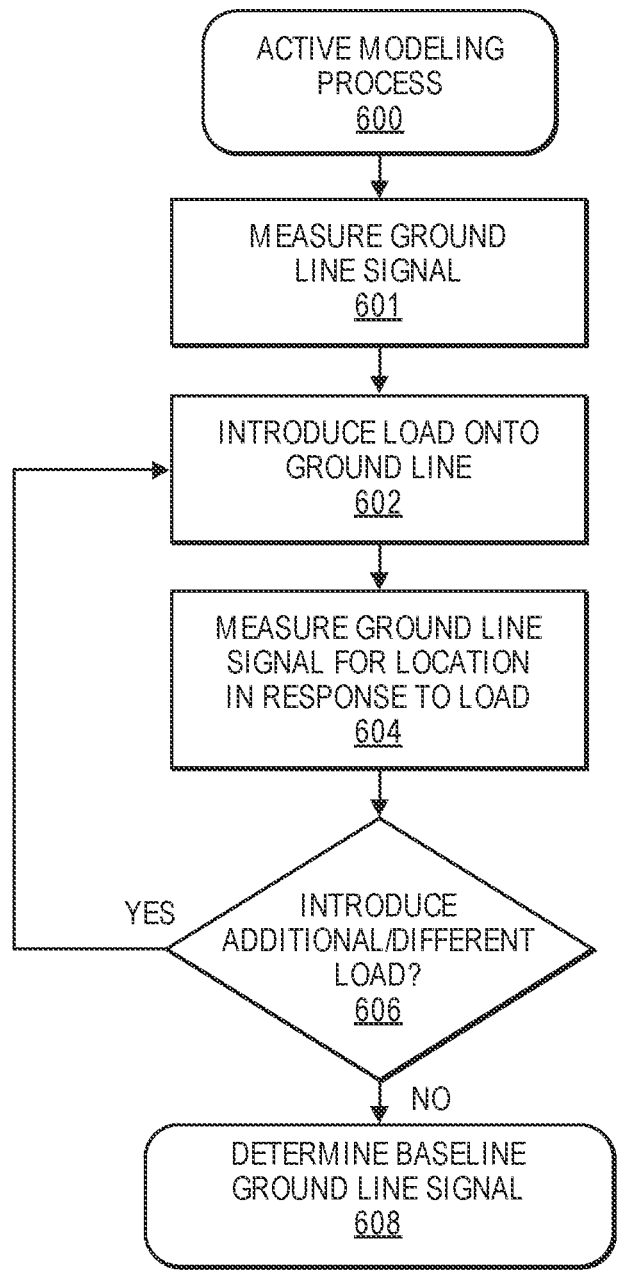
FIG. 6 is an example active modeling process, in accordance with described implementations.

FIG. 6 is an example active modeling process 600, in accordance with described implementations. The example process 600 may be performed when the plug-in sensor is first connected to a circuit, when power is detected by the plug-in sensor (e.g., after a power outage at the location), at periodic intervals, continuously, etc. The example process may be performed with one plug-in sensor at a location, or by each of multiple plug-in sensors at the location.

The example process 600 begins by the plug-in sensor measuring a ground line signal present on the ground line of the electrical circuit to which the plug-in sensor is connected, as in 601. In some implementations, rather than or in addition to measuring the ground line signal, a load may be introduced onto the ground line, as in 602. Different loads may be introduced at different times to measure the differences of those introduced loads—i.e., the ground line signals produced on the electrical circuit in response to the different introduced loads. In some implementations, rather than introducing the load directly to the ground line, the load may be introduced to the positive line and/or the neutral line. Introduction of a load on the positive line or neutral line may likewise affect the ground line signal measurable on the ground line of the electrical circuit. As the load is introduced into the circuit, the ground line signal at the location is measured to determine the change or response to the signal, as in 604.

After measuring the ground line signal produced in response to the introduced load, a determination is made as to whether an additional and/or different load is to be introduced into the circuit by the plug-in sensor, as in 606. In some implementations, multiple different loads may be introduced in parallel or in series by the plug-in sensor so that the different responses to the different types of loads can be measured on the ground line.

If it is determined that an additional and/or different load is to be introduced, the example process 600 returns to block 602 and continues. However, if it is determined that no additional and/or different loads are to be introduced, a baseline ground line signal is determined for the location, as in 608. The baseline ground line signal may be representative of just the ground line signal when no load is introduced or, in the event a load is introduced, representative of the baseline ground line signal with the introduced load. Introduction of a known load into the electrical circuit may be beneficial as it provides a known reference point for which to compare and determine changes or differences. For example, the baseline ground signal may be determined by subtracting out each of the measured signals resulting from the different introduced loads and the remaining signals identified as the baseline ground line signal.

In some implementations, the example process 600 may be performed at different times when it is known that different devices are operating at the location and/or when it is known that there are no users present at the location so that different ground line signals may be produced and established when no users are present and/or when different devices are known to be operating. An introduced load may be a resistive load, a capacitive load, or an inductive load.

For example, a resistive load may be periodically introduced into the electrical circuit and the resultant ground line signal determined at different times when different devices are known to be in different operating states. The resultant ground line signal may then be associated with those devices and/or device states as the baseline ground line signal when it is known that those devices are operating. At a later time, when user presence detection is being performed and it is known that those devices are operating, the resistive load may be introduced into the electrical circuit and the resultant ground line signal compared to stored baseline ground line signal determined under those device operating conditions to determine if a change in the ground line signal is present. If a change is present, it may be determined that a user is in physical contact with a device in the location.

In another implementation, when a user is known to be present and the device operating, the resistive load may be introduced into the electrical circuit and the resultant ground line signal measured and stored. Such a stored ground line signal may then be compared to future measurements to the ground line signal to distinguish between a user being present (similar ground line signal) and no user being present (baseline signal). At a later time, when it is known that no users are present, a baseline signal may be measured and compared with the stored ground line signal determined under those device operating conditions to determine if a change in the ground line signal is present.

As discussed above, in some implementations, more than one plug-in sensor at a location may be beneficial at monitoring and determining user presence at the location. In such instances, it may be beneficial to have the different plug-in sensors connected to the electrical circuit at the location on different phases of the circuit and/or on different branches of the circuit. Such positioning may be done when a second, or additional plug-in sensor is connected to a circuit at a location that already includes at least one plug-in sensor. When two or more plug-in sensors are present, the sensors may operate in conjunction measuring the ground line signals, or operate independently.

Figure 7:
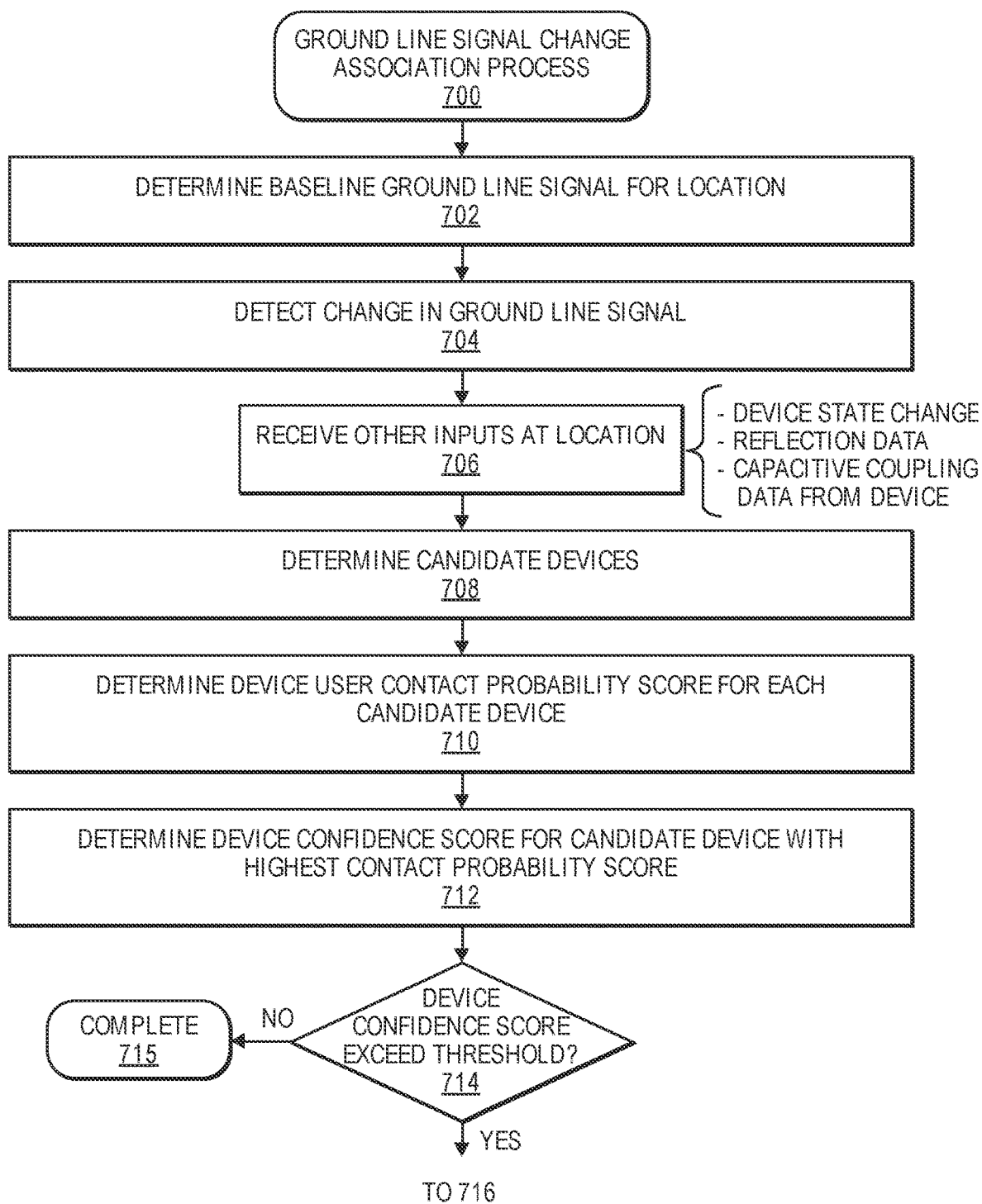
FIG. 7 is an example ground line signal change association process, in accordance with described implementations.
Figure 7:
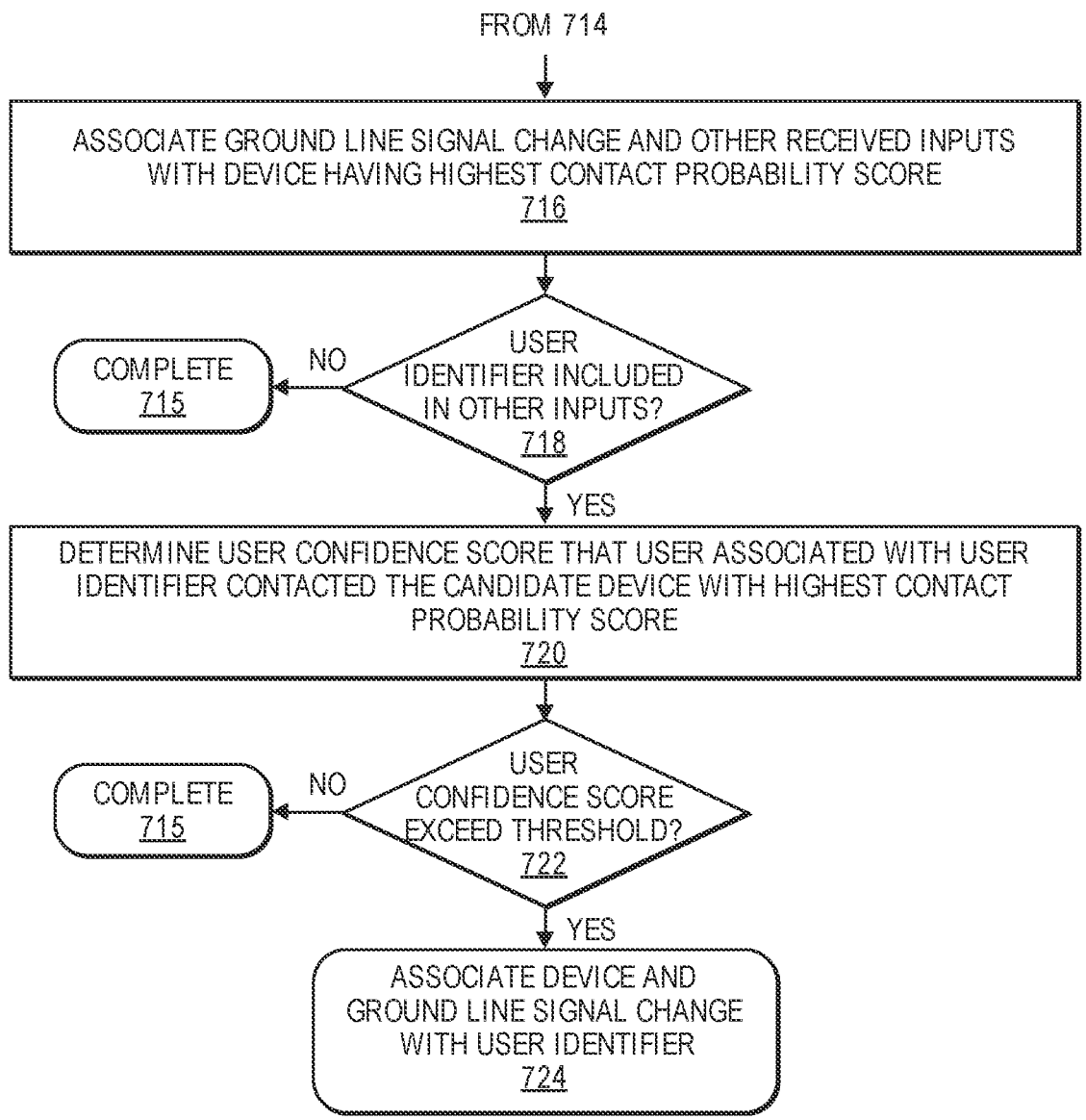

FIG. 7 is an example ground line signal change association process 700, in accordance with described implementations. The example process 700 may be performed to determine ground line signal changes, also referred to herein as ground line signatures, that are representative of a user physically contacting a device, a user contacting a specific device, and/or representative of a specific user physically contacting a specific device.

The example process 700 begins by determining a baseline ground line signal for the location, as in 702. The baseline ground line signal may be determined using the example process 600 discussed above with respect to FIG. 6. In an alternative implementation, the baseline ground line signal may be determined by measuring the signal on the ground line for a period of time, with or without introducing a load to the electrical circuit, and setting the baseline ground line signal as that measured signal.

Utilizing the baseline ground line signal, the ground line signal is then measured and the measurements compared to the baseline ground line signal to detect a change in the ground line signal, as in 704. For example, the plug-in sensor may measure the ground line signal on the ground line of the electrical circuit at periodic intervals (e.g., every 5 milliseconds). Those measurements may be compared or subtracted from the baseline ground line signal to determine a difference between the measured ground line signal and the baseline ground line signal. If there is no difference, then no user is detected. In comparison, if there is a difference or change in the ground line signal, the difference may be representative of a user physically contacting a device at the location that is connected to the ground line. In some implementations, the difference may need to exceed a threshold before a change in the ground line signal is determined. In other implementations, any difference may be indicative of a change in the ground line signal. A detected ground line signal change, or ground line signature, may be the signal remaining after the baseline ground line signal is removed or subtracted from the measured ground line signal.

In some implementations, other inputs, such as device state change information, reflection data, capacitive coupling data, and/or data from one or more devices may also be received, as in 706. Device state change data may be any information received from one or more devices in the location and/or the communication hub indicating a device state change. For example, activation of a refrigerator light may result in a device state change generated by the refrigerator, indicating that the light has transitioned from an off state to an on state. Reflection data, as discussed herein, may be generated based on signals wirelessly transmitted from the power lines at the location to determine the position or presence of users at the location. Capacitive coupling data, as discussed herein, may indicate presence information of a user near one or more devices. Other information or device data may likewise be received and utilized as other inputs in the example process 700. For example, device state changes may be detected as voltage changes measured on one or more of the positive line, neutral line, or ground line of the electrical circuit. Such voltage changes may be unique in pattern or signature and utilized to determine the device that has changed states and caused the voltage change. Other devices, such as a portable device carried by the user may provide inputs such as position information (e.g., GPS data), user identifiers, etc.

Based on the change in the ground line signal and/or based on the received other inputs, one or more candidate devices at the location are determined, as in 708. A candidate device is any device the user may have physically contacted to cause the ground line signal change. Determination of candidate devices may be based on a variety of factors. For example, if state change information is received for a device indicating a state change from an off or idle state to an active or on state, such devices may be included as candidate devices. In comparison, if state change information is received indicating that the device is or remains in an idle or off state, the device may not be included as a candidate device. In still other examples, all devices at the location that a coupled to the power line, whether active, idle, on, or off, may be considered candidate devices.

Based on the candidate devices and the determined ground line signal change, a device user contact probability score may be determined for each candidate device, as in 710. The device user contact probability scores may be based on, for example, the other inputs received for the location and/or based on a comparison of the measured ground line signal change with stored ground line signal changes for each candidate device. For example, as discussed herein, ground line signal changes representative of users physically contacting a device may be determined over a period of time, associated with devices, and stored as representative of the ground line signal change that is detectable when a user physically contacts that device. By comparing the measured ground line signal change with a stored ground line signal change for a candidate device, a device contact probability score may be computed based on the similarity between the measured ground line signal change and the stored ground line signal change for that candidate device. The device contact probability score may be increased or decreased based on other inputs received. For example, the device contact probability score for a user physically contacting a refrigerator may be increased if the other inputs indicate that the interior light of the refrigerator was illuminated and the compressor of the refrigerator activated. In comparison, the device user contact probability score for a hair dryer (device) at the location may be decreased if no state change is received or determined for the hair dryer.

Utilizing the device user contact probability scores, device confidence scores are determined for the candidate device with the highest device user contact probability score, as in 712. The confidence score may be determined based on a difference between device user contact probability scores. For example, if the highest device user contact probability score is 98% and the next highest device user contact probability score is 33%, the large difference in scores indicates a high confidence that the device with the highest device user contact probability score is the device contacted by the user. In comparison, if the highest device user contact probability score is 98% and the second highest device user contact probability score is 95%, there is a low confidence that the correct device has been identified.

A determination is then made as to whether the device confidence score for the device having the highest device user contact probability score exceeds a threshold, as in 714. The threshold may be any defined threshold. If it is determined that the confidence score does not exceed the threshold, the example process completes and no association is stored or updated, as in 715. In comparison, if the confidence score does exceed the threshold, the measured ground line signal change or ground line signature and other received inputs are associated with the device having the highest device user contact probability score, as in 716. As discussed further herein, associating the measured ground line signal change with a device determined to be physically contacted by the user, and storing the measured ground line signal change, the stored and associated ground line signal change may be used later by the described implementations to detect other measured changes in the ground line signal as a physical contact by a user with that specific device.

A determination may also be made as to whether a user identifier is included in the other received inputs, as in 718. As noted above, in some implementations, a user identifier may be received from one or more devices, such as a portable device (e.g., smart phone, wearable) in the possession of the user. If it is determined that a user identifier is not included in the other received inputs, the example process 700 completes, as in 715. However, if it is determined that a user identifier is received in the other inputs, a user confidence score is computed that indicates a confidence that a specific user associated with the user identifier actually physically contacted the device determined to have the highest device user contact probability score, as in 720. The user confidence score may be based on, for example, the other received inputs, the ground line signal change, etc. For example, if only one user is determined to be present at the location and/or within a detectable distance of the determined device, the user confidence score may be high. In comparison, if there are multiple users at the location and/or multiple users within a detectable distance of the determined device, the user confidence score may be low.

A determination is then made as to whether the user confidence score exceeds a threshold, as in 722. The threshold may be any defined value or amount and may vary for different devices, different users, different times of day, different locations, etc. If the user confidence score does not exceed the threshold, the example process completes, as in 715. In comparison, if the user confidence score does exceed the threshold, the device determined to have the highest user contact probability score and the measured ground line signal change are associated with the user identifier as representative of the ground line signal change that occurs when that specific user physically contacts that specific device, as in 724.

By generating associations between measured ground line signal changes and devices and/or measured ground line signal changes, user identifiers, and devices, the system may develop different ground line signatures for different devices and/or different device and user combinations that may be utilized to determine the presence of a user at a location, the position of a user at the location or, in some implementations, the identity of the user at the location. Such determinations may be done without placement of additional sensors or other equipment within the location. all that is needed is a plug-in sensor plugged into an electrical outlet at the location.

Figure 8:
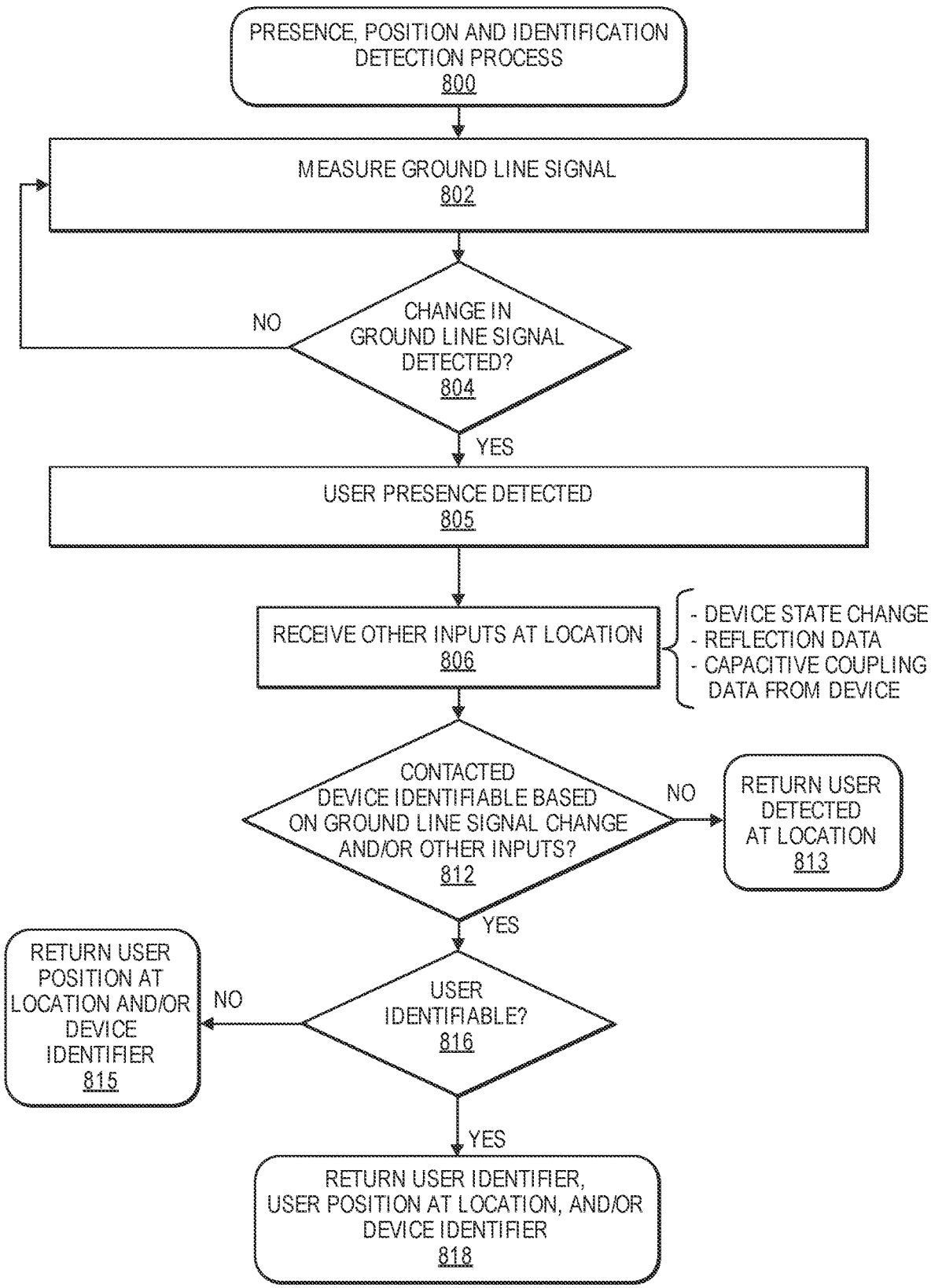
FIG. 8 is an example presence, position, and identification detection process, in accordance with described implementations.

FIG. 8 is an example presence, position, and identification detection process 800, in accordance with described implementations. The example process 800 begins by measuring the ground line signal, as in 802. In one implementation, the ground line signal may be measured by a plug-in sensor that is inserted into any common electrical outlet of the electrical circuit at a location. Because ground lines of a location are typically connected, the plug-in sensor may be positioned anywhere in the electrical circuit of the location.

As the ground line signal is measured, it may be compared with a stored baseline ground line signal for the location and a determination made if a change to the ground line signal is detected, as in 804. As discussed above, a baseline ground line signal may be established for a location and maintained in a data store or in a memory of the plug-in sensor. In implementations in which no baseline ground line signal is detected, the measured ground line signal may be compared with other measurements taken at other points in time to determine changes in the ground line signal between those points in time.

If it is determined there is no change in the ground line signal, the example process 800 returns to block 802 and continues. If there is a change detected in the ground line signal, the example process determines that a user presence is detected at the location, as in 805. As discussed, the user presence may be inferred or determined due to the change in the ground line signal resulting from the user physically contacting a device that is electrically connected to the electrical circuit at the location. In some implementations, the measured ground line signal may need to be sufficiently different than a baseline ground line signal before it is determined that a user is detectable from a change in the ground line signal.

In addition to determining that a user presence has been detected, other inputs may also be received, as in 806. Other inputs may include, but are not limited to, device state changes of devices at the location, reflection data, capacitive coupling data, and/or other data from devices at the location. Device state change data may be any information received from one or more devices in the location and/or the communication hub indicating a device state change. For example, activation of a refrigerator light may result in a device state change generated by the refrigerator, indicating that the light has transitioned from an off state to an on state.

Reflection data, as discussed herein, may be generated based on signals transmitted from the power lines at the location to determine the position or presence of users in the location. Capacitive coupling data, as discussed herein, may indicate presence information of a user near one or more devices, as discussed herein. Other information or device data may likewise be received and utilized as other inputs in the example process 800. For example, device state changes may be detected as voltage changes measured on one or more of the positive line, neutral line, or ground line of the electrical circuit. Such voltage changes may be unique in pattern or signature and utilized to determine the device that has changed states and caused the voltage change. Other devices, such as a portable device carried by the user may provide inputs such as position information (e.g., GPS data), user identifiers, etc.

Based on the determined ground line signal change and/or the received other inputs, a determination is made as to whether the contacted device is identifiable, as in 812. As discussed above, different ground line signal changes, also referred to herein as ground line signatures, may be maintained in a data store and associated with a device. In such an example, the measured ground line signal change may be compared to stored ground line signal changes to determine if the device contacted by the user that resulted in the measured ground line signal change is detectable. In other implementations, if state change data or other data from a device is received that correlates with the measured ground line signal change, it may be determined that a particular device was physically contacted by the user. For example, if a device sends state change data that correlates in time with the measured device signal change, it may be determined that the reporting device was the device physically contacted by the user.

If it is determined that the device cannot be identified, the example process returns a notification that a user has been detected at the location, as in 813. This notification may only provide presence information indicating the general presence of a user at the location and a time at which the detection occurred.

If it is determined that the device that was physically contacted by the user can be identified, a determination is made as to whether the specific user that physically contacted the device can be identified, as in 816. For example, if a user identifier is included in the received other information, the user identifier may be determined to identify the user. Such a determination may be constrained based on whether multiple user identifiers are received and/or whether position information is also received with the user identifier. For example, if only one user identifier is received for the location, it may be inferred that the user identifier is representative of the user that physically contacted the device. In comparison, if multiple user identifiers are received, additional information, such as location information, may be necessary before user identification can be determined. As another example, as discussed herein, the ground line signal may uniquely identify both the user and the device. In such an instance, the ground line signal, alone or in combination with other inputs, may be used to identify the user.

If it is determined that the user that physically contacted the device cannot be identified, the example process 800 returns a notification indicating the position of the user within the location and, optionally, the device identifier of the device physically contacted by the user, as in 815. As discussed, the position of the user is determined based on the known position of the identified device within the location. If the user is identified, the example process may return a notification that indicates the user identifier of the user, the position of the user within the location and, optionally, the device identifier of the device physically contacted by the user, as in 818.

Figure 9:
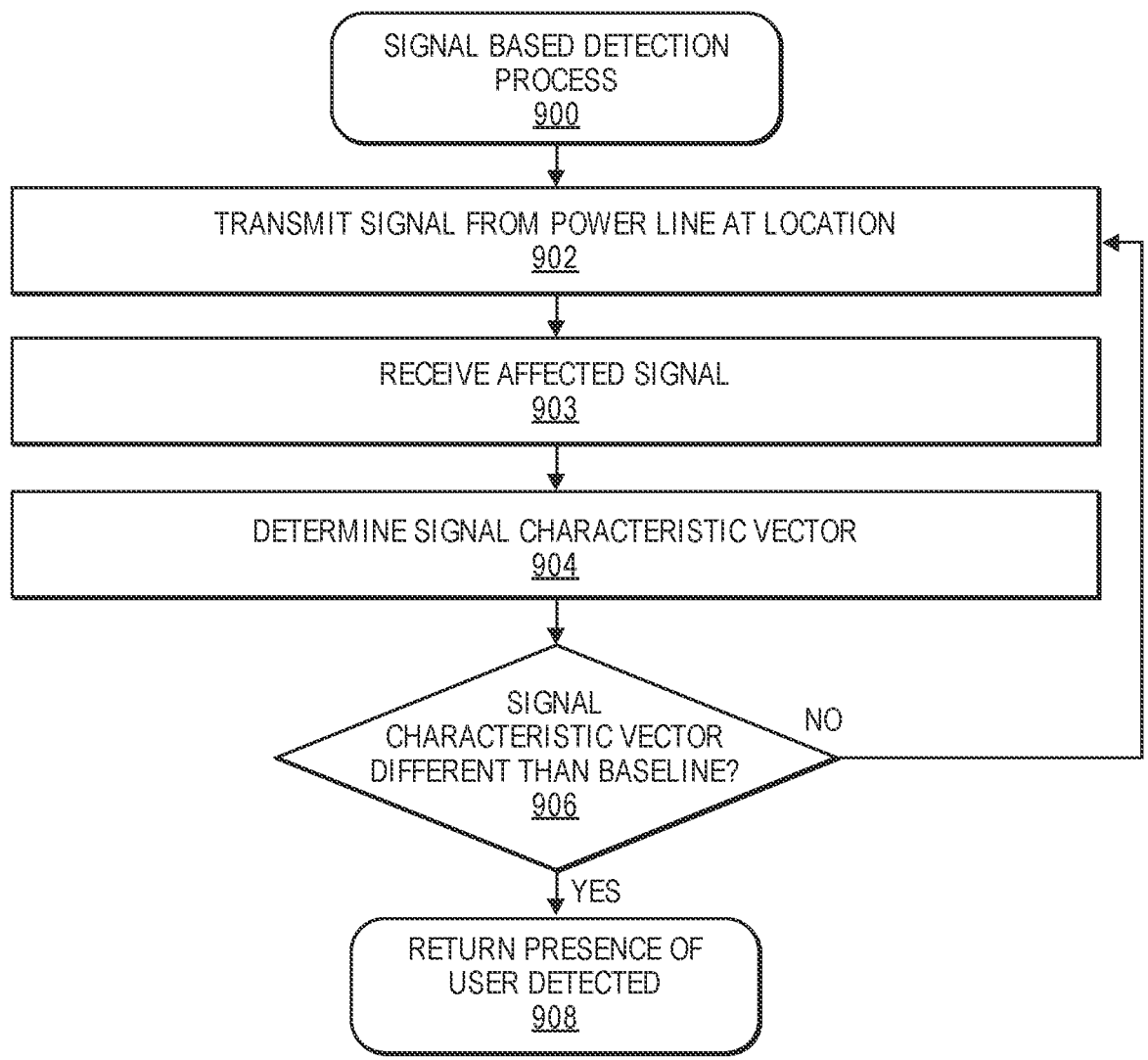
FIG. 9 is an example signal based detection process, in accordance with described implementations.
Figure 11:
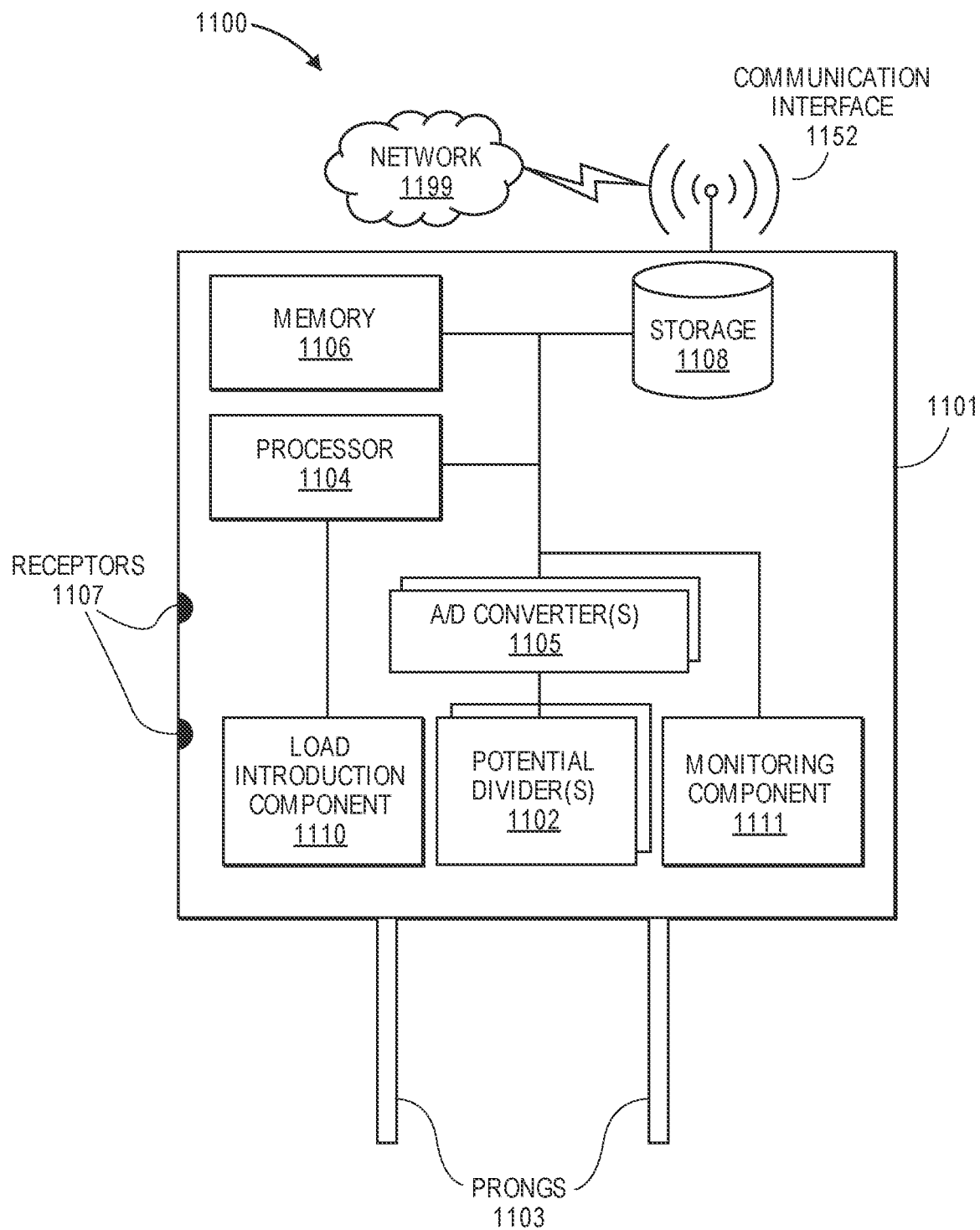
FIG. 11 illustrates example components of a plug-in sensor, in accordance with described implementations.

FIG. 9 is an example signal based detection process 900, in accordance with described implementations. The example process begins by introducing a signal, such as an RF signal, onto the existing power line at a location, as in 902. As discussed, the signal may be introduced using an electrical signal transmitter of a plug-in sensor, such as the load induction component 1110 (FIG. 11). Likewise, the signal may be introduced onto any one or more of the positive line, the neutral line, or the ground line. The signal, after reflecting off a surface or object is received by a receiver as an affected signal, such as an electrical signal receiver included in the plug-in sensor and/or via the power lines of the location, as in 903.

A signal characteristic vector of the affected signal is then determined, as in 904. As discussed above, the signal characteristic vector may be computed as, for example, a time offset between the transmission time of the signal and the receipt of the reflected signal which is then used to determine a distance to the object off which the signal reflected. Alternatively, or in addition thereto, the signal characteristic vector may be computed as a measured signal attenuation resulting from the signal being absorbed, reflected, noise, etc.

The signal characteristic vector may then be compared to a baseline signal characteristic vector to determine a difference between the two vectors, as in 906. In some implementations, a baseline signal characteristic vector may be determined using the above described techniques when it is known that there are no users in the location. Alternatively, multiple signal characteristic vectors may be computed over time and a vector that is determined a majority of those times utilized and/or stored as the baseline signal characteristic vector.

If it is determined that the computed distance is different than the baseline distance, the example process returns a notification of a detected user presence, and optionally, position information for the user, as in 908. In some implementations, the difference must exceed a defined threshold or amount before it is determined that a user is present at the location and/or to determine a position of the user. As with the other examples discussed herein, the threshold may be any defined amount and may vary for different locations, different times of day, different frequencies, etc. In some implementations, the threshold may not exist and any detected change may be considered indicative of user presence.

While the above example process 900 is discussed with respect to a location and emitting a signal from an electrical circuit within the location, in some implementations, the example process may be localized to specific positions or rooms within the location. For example, if the plug-in sensor is inserted into an electrical outlet in a room of a location and the portion or branch of the electrical circuit covers plugs in that room, the position detection may be limited to that room within the location by emitting the signal on that portion of the electrical circuit and then receiving the reflected signal at a receiver of the plug-in sensor.

Figure 10:
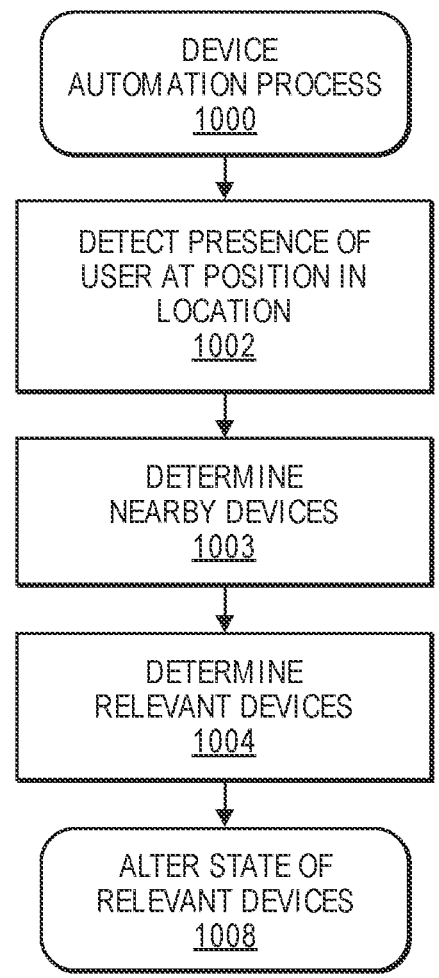
FIG. 10 illustrates an example related device automation process, in accordance with described implementations.

FIG. 10 illustrates an example related device automation process 1000, in accordance with described implementations. In this example, presence of a user at a position within the location is detected using any of the herein described techniques, as in 1002. Likewise, the devices that are physically near the position of the user are determined, as in

1003. For example, if it is determined that the user is in the kitchen and has contacted the microwave, other devices that are physically near the user may include a refrigerator, ice machine, dishwasher, sink, lights, stove, oven, etc. As another example, the position and/or identity of the user, as determined from the described implementations, may be used as an input to one or more speech processing techniques, as discussed further below with respect to FIG. 12.

For the determined devices, one or more relevant devices may be selected, as in 1004. Relevant devices may be selected based on the user identity, the device physically contacted by the user, the position of the user, etc. For example, if the user is determined to be in the kitchen, the lights in the kitchen may be selected as relevant devices. Likewise, if it is determined that the user has opened the dishwasher, and the dishwasher contains clean dishes, it may be determined that the lights in the pantry where clean dishes are stored is another relevant device.

Finally, for each determined relevant device, the state of the relevant device may be altered to a state that corresponds with the user or the activity, as in 1008. Continuing with the above example, the lights in the kitchen and the pantry may be illuminated in response to the user opening the dishwasher when it is known that the dishwasher contains clean dishes.

FIG. 11 illustrates example components of a plug-in sensor 1100, in accordance with described implementations. In implementations, the plug-in sensor 1100 is configured to be installed into an electrical outlet to interact with an electrical circuit at the location. As such, the plug-in sensor will include an insulating housing 1101, such as a plastic body or shell. In some implementations, the housing 1101 will be in the form of a cube such that the plug-in sensor has an appearance of a charger or other common electrical component. Protruding from the housing is at least one prong 1103. In most instances, as illustrated in FIG. 11, there are two prongs 1103 extending from the housing. In some implementations, there may be a third prong, or ground. The prongs interface with the electrical circuit at the location and enable the plug-in sensor to monitor voltage at the location, monitor ground line signals, transmit codes, introduce loads or signals, such as RF signals, into the circuit at the location. For example, the prongs may be inserted into a common electrical outlet at the location.

Coupled to the prongs 1103 may be one or more potential dividers 1102, such as voltage dividers. In some implementations there are three potential dividers, one for voltage measured from the lead line, one for voltage measured from the neutral line, and one for voltage measured from the ground line. In other implementations, there may be additional or fewer potential dividers. The potential dividers 1102 convert a high voltage, such as 120 volts, of the electrical circuit at the location into a lower voltage that can be recorded and analyzed at high frequencies (e.g., 200 kilohertz). In still other examples, the potential dividers may be omitted and the received signal may be digitized as it is received.

The one or more potential dividers may be coupled to one or more analog-to-digital converters 1105. The analog-to-digital converters receive the high frequency sampling produced by the one or more potential dividers 1102 and convert the analog signal to digital data, referred to herein as voltage data. The voltage data may be stored to memory, such as a random access memory ("RAM"), flash memory, or other form of permanent or temporary storage 1108. Any form of memory may be used with the disclosed implementations.

The prongs 1103 may also be coupled to a load introduction component 1110, and/or a monitoring component 1111. The load introduction component may be operable to introduce one or more loads into the electrical circuit to which the plug-in sensor is coupled. For example, the load introduction component may be operable to introduce any one or more of a resistive load, an inductive load, or a capacitive load into the electrical circuit. As another example, the load introduction component may be an electrical signal transmitter that introduces a load in the form of a signal, such as an RF signal, which may be introduced onto any one or more of the positive line, neutral line, or the ground line.

The monitoring component 1111 may be configured to monitor voltage patterns, ground line signals, received affected electrical signals, etc., on the electrical circuit. In one example, the monitoring component 1111 may include an electrical signal receiver that receives affected signals, such as affected RF signals.

As discussed above, the monitoring component 1111 may also include components that are configured to measure voltage patterns between the lead and ground line, the neutral and ground line, and/or the ground line and a reference point (also referred to herein as a ground line signal). The voltage patterns in the different lines (lead, neutral, ground) may be monitored simultaneously by different components of the monitoring component 1111. Likewise, the monitoring component 1111 may be in communication with the processor 1104, the memory 1106, and/or the communication interface 1152.

The memory 1106 stores program instructions that are executable by the one or more processors to cause the one or more processors to perform any one or more portions of the implementations discussed herein. In addition, the memory 1106 and/or the storage 1108 may also maintain a signature data store that includes, for example, signature data of devices, such as ground line signals, known to be at the location and/or device states of devices known to be at the location. The memory 1106 and/or storage 1108 may also maintain baseline ground line signals for the location, ground line signal changes for specific devices, ground line signal changes for specific users when physically contacting specific devices, baseline distance information for the location and/or positions/rooms within the location, etc.

The plug-in sensor 1100 may also include a communication interface 1152, such as a wireless antenna, that enables the plug-in sensor to connect to one or more wireless networks 1199, such as a Wi-Fi network, Bluetooth network, etc., and transmit or receive information, such as detected signature data, ground line signals, voltage data, codes, etc.

In some implementations, the plug-in sensor may also include one or more electrical prong receptors 1107 that are configured to receive electrical prongs of one or more other devices and allow alternating current to passthrough so that the electrical outlet may be utilized by other connected devices, in addition to the plug-in sensor 1100. In still other implementations, the components of the plug-in sensor 1100 may be incorporated entirely into another device, such as a communication component, a communication hub, a device, etc.

Figure 12:
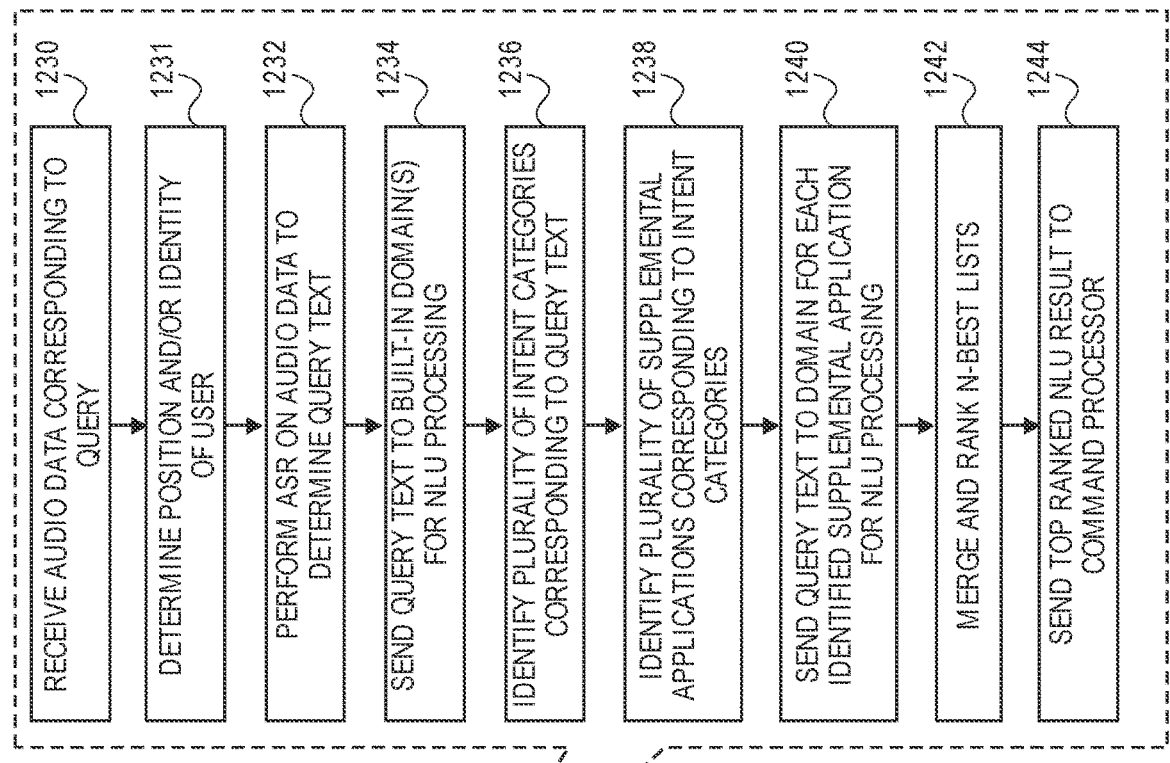
FIG. 12 illustrates a system for establishing a communication session between speech-controlled devices in an automatic speech recognition (ASR) system, in accordance with described implementations.
Figure 12:
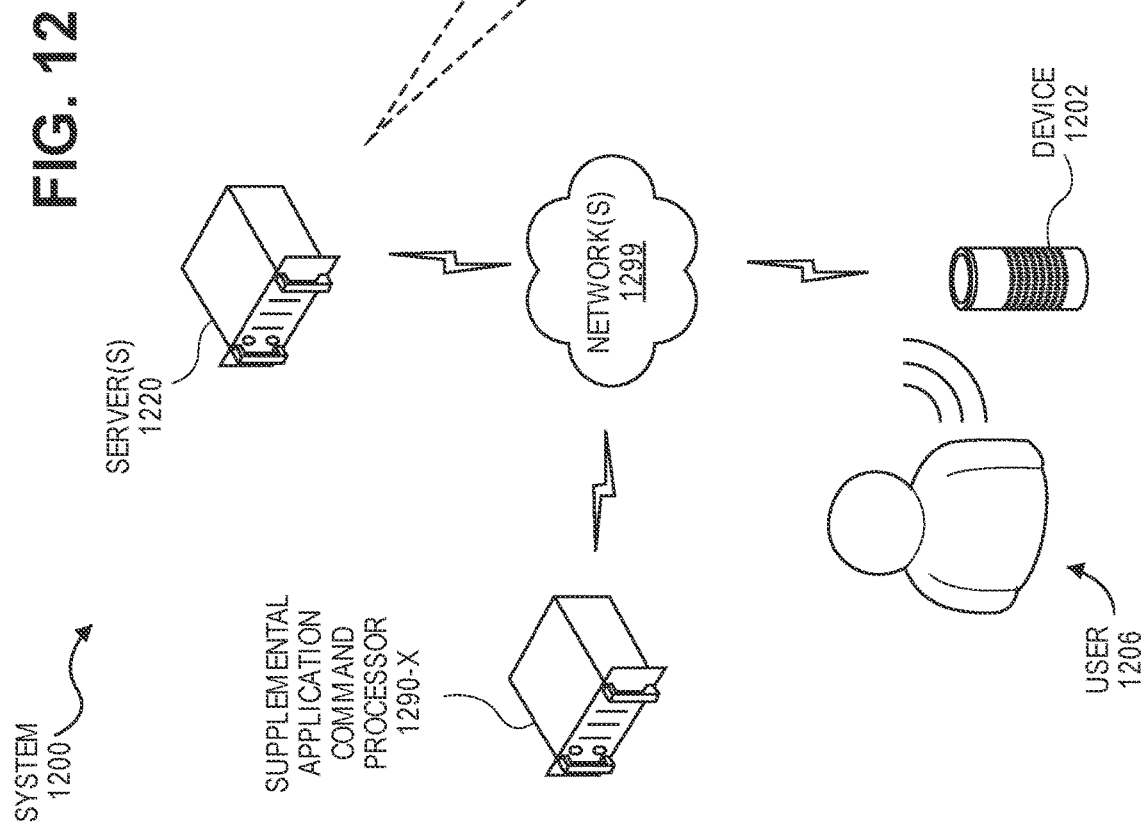

FIG. 12 shows a system 1200 configured to perform NLU processing. A system 1200 may include one or more devices 1202 local to user(s) 1206 at the location where the user is positioned, as well as one or more networks 1299 and one or more servers 1220 connected to device 1202 across network(s) 1299. The server(s) 1220 (which may be one or more different physical devices) may be capable of performing traditional speech processing (such as ASR, NLU, query parsing, etc.). A single server may be capable of performing all speech processing or multiple server(s) 1220 may combine to perform the speech processing. Further, the server(s) 1220 may be configured to execute certain commands, such as answering queries spoken by the user 1206. In addition, certain speech detection or command execution functions may be performed by the device 1202.

As shown in FIG. 12, a system may receive (1230) audio data corresponding to a query. The system many then determine if an input has been received from one of the described implementations indicating a position of the user (1231) within the location and/or an identity of the user (1231). Such information may be used to refine or limited the ASR analysis performed on the query to a context potentially relevant to the user and/or the position of the user at the location. Likewise, the position and/or identity of the user may be used to limit or act as a weight in determining intent categories and/or applications, as discussed.

The system may then perform (1232) ASR on the audio data to determine query text. The system may then send (1234) the query text to NLU domains corresponding to built-in functionality of the system 1200. Those domains may then perform NLU processing to obtain N-best lists (one for each built-in domain). The system may also identify (1236) a plurality of intent categories corresponding to the query text along with scores for how the query text matches each intent category. The system may then identify (1238) a plurality of applications corresponding to the intent categories. The applications may correspond to supplemental applications created by third-party developers and added to the system 1200 to enhance the system functionality. The system may then send (1240) the query text to the NLU domains for each of the identified supplemental applications. Each domain for a supplemental application may then perform NLU processing to obtain N-best lists (one for each identified supplemental domain). The system may then merge and rank (1242) the N-best lists resulting from the NLU processing of the built-in domains and domains for the supplemental applications. The system may then send (1244) the top ranked result to a command processor 1290, which, for a result associated with a supplemental application, may be a supplemental application command processor 1290-X, which may be located separately from system 1200.

Figure 13:
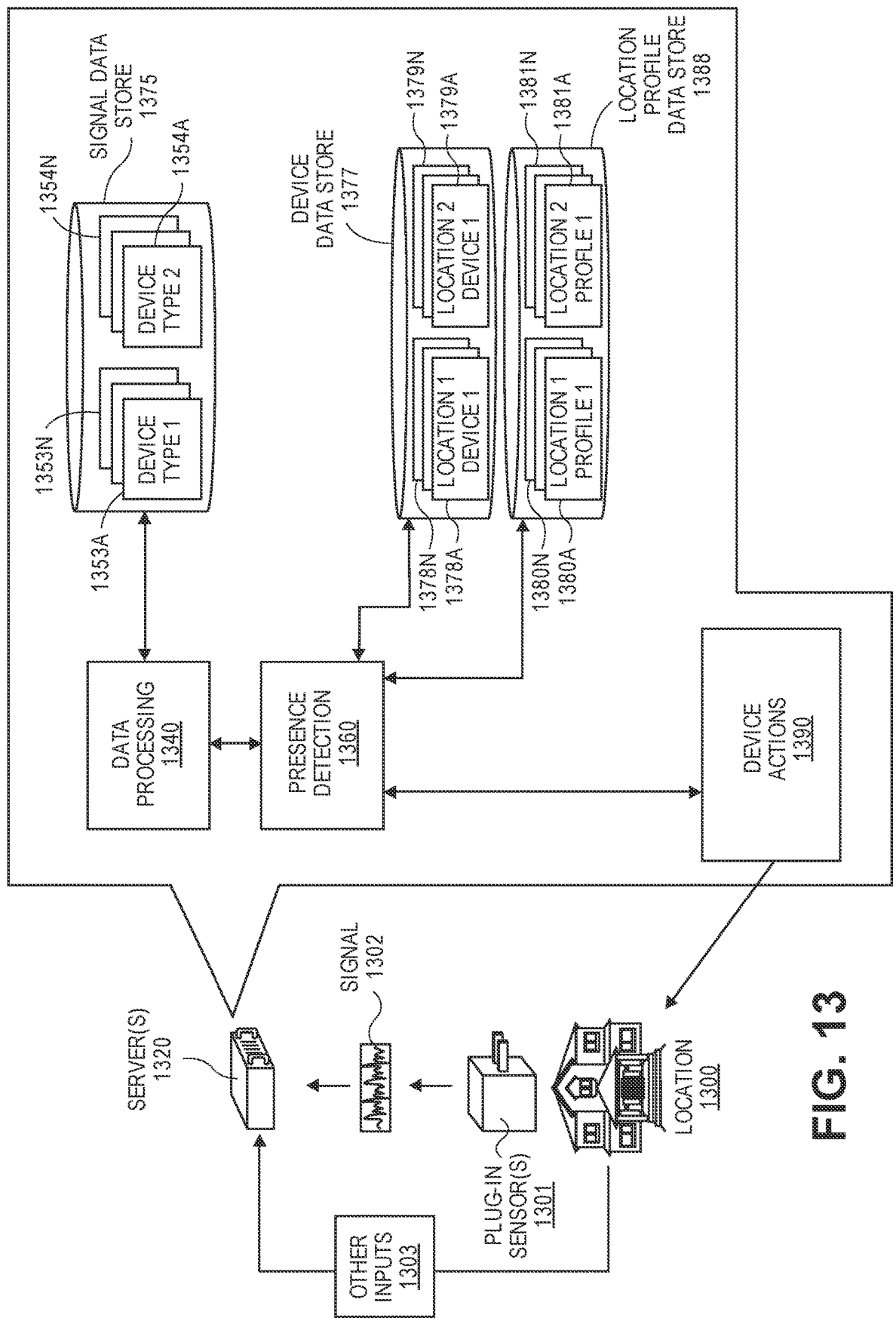
FIG. 13 illustrates example components of a management system, in accordance with described implementations.

FIG. 13 is a conceptual diagram of a server 1320 that processes voltage data/ground line signals 1302 and/or other inputs 1303 received from one or more plug-in sensors 1301 at various locations 1300 and device actions 1390, in accordance with described implementations. One or more plug-in sensors 1301 may be a different locations 1300, each plug-in sensor providing one or more signals 1302 that are received by the server(s) 1320.

The various components of the server 1320 may be located on the same or different physical devices. Communication between various components illustrated in FIG. 13 may occur directly or across a network. In operation, the server 1320 may include computer-readable and computer-executable instructions that reside on the server 1320 and perform one or more of the described features or functions, also referred to herein as a management system.

The device actions processor 1390 may function to determine and recommend one or more device actions, such as transitioning a device from an idle state to an active state based on information determined about a user and/or a position of a user within a location. Upon determining one or more device actions to be performed at a location, the device actions processor 1390 may generate and send command data and/or message data to a communication component, communication hub, and/or devices at the location 1300 for programmatic execution by the device(s) at the location 1300.

Signal data 1302, such as voltage data, ground line signals, distance information, from one or more plug-in sensors 1301 at a location 1300 is transmitted in real time, near real time, or periodically to one or more remote computing resources, illustrated in this example as a server 1320. The server receives and processes the signal 1302 with signal data processing component 1340. Processing may include processing the signal data to determine presence of a user that physically contacted the device, position of a user within the location, and/or an identity of a user within the location by comparing the signal data to stored baseline signal data that is known for the location. The signal data store 1375 may maintain device type information and/or baseline signals, such as baseline ground line signals for different devices and/or different users contacting different devices. For example, signal data of device type 1 may include multiple different baseline ground signals 1353A-1353N corresponding to different physical contacts with devices of that device type by different users. Likewise, signal data of device type 2 may include multiple different baseline ground signals 1354A-1354N corresponding to different physical contacts with devices of that device type.

In some implementations, rather than voltage data or signal data 1302 being sent from the location 1300 to the servers 1320, the plug-in sensor 1301, a communication hub at the location, or a communication component at the location may process the baseline ground signals to determine a physical contact with the device by the user and/or a device or device type of the contacted device. A device identifier of the determined device and/or ground line signal change may then be sent to the servers 1320 for additional processing.

As baseline ground line signals are collected and devices determined, the information, including the device identifiers, baseline ground line signal, etc., may be aggregated with other similar data generated by other devices at the location 1300 to develop a location profile 1380, that is stored in a location profile data store 1388. The location profile 1380 may include device identifiers and/or baseline ground line signal data for devices known or determined to be at the location 1300, any operational relationships between devices and/or device states, etc.

As location profiles 1180 are developed for different locations, those profiles may be stored in a location profile data store 1388. In some implementations, different location profiles may be generated for a location based on, for example, the day of the week, the number of people at the location, etc. Over time, multiple location profiles may be created for each location and maintained in the location profile data store 1388. For example, location 1 may include multiple location profiles 1380A-1380N generated at different points in time for that location. Likewise, location 2 may include multiple location profiles 1381A-1381N generated at different points in time for that location. Every location may include one or more location profiles that are stored in the location profile data store 1388. The location profiles, which may be associated with different periods of time during the year, may be used to predict device states and times during which devices are in high demand/high use or low demand/low use.

In some implementations, a device data store 1377 may also be maintained. The device data store 1377 may include information regarding devices at each location. For example, the device data store may maintain device information 1378A-1378N for each of multiple different devices at a first location, maintain device information 1379A-1379N for each of multiple different devices at a second location, etc.

Device information may include, among other information, signature data, such as ground line signals, generated by different device states of the device and/or when a user physically contacts the device, the manufacturer of the device, the make, model, and year of manufacture, the power rating of the device, the efficiency of the device, etc. In some implementations, data received from a same type of device operating at different locations may be compared to determine consistency among devices and/or to detect potential device problems or abnormalities. For example, if there are fifty microwaves of Brand A and forty-nine of them have similar power demands but the fiftieth one has a higher power demand, it may be determined that the fiftieth microwave is potentially malfunctioning.

Presence detection component 1360 obtains measure ground line signals, reflected signal information, capacitive information, and/or other inputs such as the location profile and/or user profile data and utilizes that information to determine whether a user is present at the location, the position of the user within the location, the identity of the user present at the location and/or one or more device actions that may be performed by one or more devices at the location. For example, one or more modeling algorithms may receive the various inputs and determine one or more related devices and one or more actions to be performed by those devices.

Upon determining by the presence detection component 1360 one or more device actions, the device action processor 1390 may generate command data that includes instructions that cause one or more devices to programmatically perform the action. The command data and/or message data may then be sent to a communication component, communication hub, and/or directly to devices at the location 1300, as discussed above.

Figure 14:
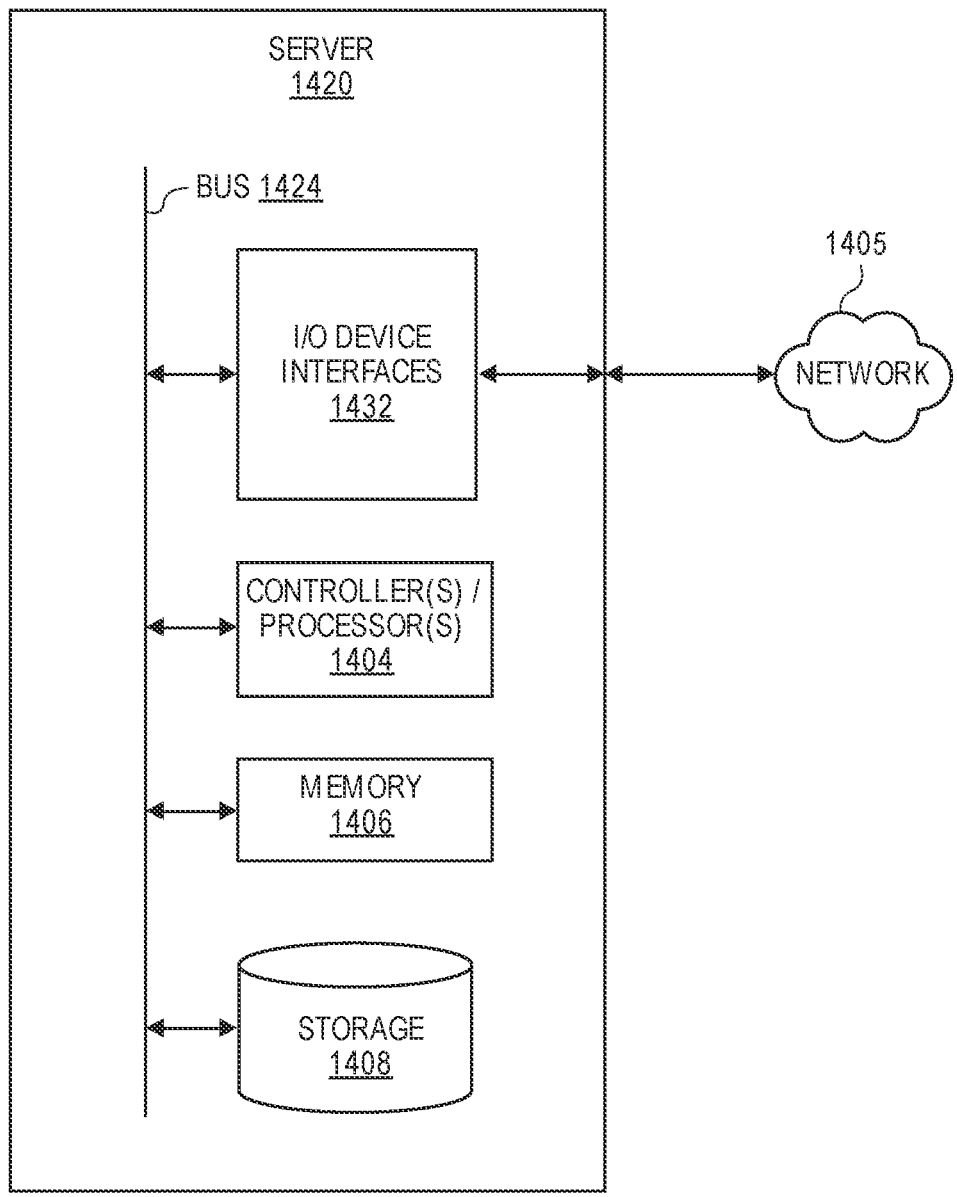
FIG. 14 illustrates example components of a server, in accordance with described implementations.

FIG. 14 is a block diagram conceptually illustrating example components of a remote device, such as a remote server 1420 that may assist with command processing and/or operation of the management system. In operation, the server 1420 may include computer-readable and computer-executable instructions that reside on the server 1420, as will be discussed further below.

The server 1420 may include one or more controllers/processors 1404, that may include a central processing unit (CPU) for processing data and computer-readable instructions, and a memory 1406 for storing data and instructions of the respective device. The memories 1406 may individually include volatile random access memory (RAM), non-volatile read only memory (ROM), non-volatile magnetoresistive (MRAM) and/or other types of memory. The server 1420 may also include a data storage component 1408, for storing data and controller/processor-executable instructions. The data storage component 1408 may include one or more non-volatile storage types such as magnetic storage, optical storage, solid-state storage, etc. The server 1420 may also be connected to removable or external non-volatile memory and/or storage (such as a removable memory card, memory key drive, networked storage, etc.) through an input/output device interface 1432.

Computer instructions for operating the server 1420 and its various components may be executed by the controller(s)/processor(s) 1404, using the memory 1406 as temporary "working" storage at runtime. The server's 1420 computer instructions may be stored in a non-transitory manner in non-volatile memory 1406, storage 1408, or an external device(s). Alternatively, some or all of the executable instructions may be embedded in hardware or firmware on the respective device in addition to or instead of software.

The server 1420 may also include input/output device interfaces 1432 that may connect to a network 1405. A variety of components may be connected through the input/output device interfaces. Additionally, the server 1420 may include an address/data bus 1424 for conveying data among components of the server 1420. Each component within the server 1420 may also be directly connected to other components in addition to (or instead of) being connected to other components across the bus 1424.

The server 1420 may wirelessly communicate with and receive signature data, such as ground line signals and/or voltage data from locations and/or provide instructions to devices within the location and/or receive data from the devices. Any form of wired and/or wireless communication may be utilized to facilitate communication between the server 1420, plug-in sensors, communication hubs, communication components, and/or devices. For example, any one or more of 802.15.4 (ZIGBEE), 802.11 (WI-FI), 802.16 (WiMAX), BLUETOOTH, Z-WAVE, near field communication ("NFC"), etc., may be used to communicate between the server 1420 and one or more plug-in sensors, communication components, communication hubs, and/or devices.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, energy management, and speech processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the components and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A method, comprising:
   introducing, with an electrical signal transmitter, a radio frequency ("RF") signal onto a line of an electrical circuit that provides electricity to one or more rooms of a location;
   subsequent to introducing the RF signal, receiving, with a receiver at the location, an affected signal generated as a result of the RF signal reflecting off an object at the location;
   determining a signal characteristic vector of the affected signal;
   comparing the signal characteristic vector with a baseline signal characteristic vector to determine a difference between the signal characteristic vector and the baseline signal characteristic vector, wherein the baseline signal characteristic vector is indicative of the location when no user is present at the location;
   determining, based at least in part on the difference, a position of a user within the location;
   receiving, with a device, audio data that includes a speech of the user;
   refining an automatic speech recognition ("ASR") analysis of the audio data based at least in part on the position of the user at the location;
   performing the ASR analysis of the audio data, as refined based at least in part on the position, to determine an action to be performed by one or more devices;
   generating instructions that cause the one or more devices to perform the action; and
   sending the instructions to the one or more devices.

2. The method of claim 1, further comprising:
   determining that the difference exceeds a threshold.

3. The method of claim 1, wherein the signal characteristic vector is computed as a time offset between a transmission time at which the RF signal is introduced onto the line of the electrical circuit and a receipt time at which the affected signal is received with the receiver.

4. The method of claim 1, wherein the signal characteristic vector is computed based on a plurality of signal characteristic vectors determined over a period of time.

5. An apparatus, comprising:
   a radio frequency ("RF") signal transmitter operable to introduce an RF signal onto a line of an electrical circuit that provides electricity to one or more rooms of a location;
   a receiver operable to receive an affected signal;
   one or more processors; and
   a memory storing program instructions that, when executed by the one or more processors, cause the one or more processors to at least:
   introduce, with the RF signal transmitter and at a first time, the RF signal onto the electrical circuit;
   receive, with the receiver and at a second time that is subsequent to the first time, the affected signal;
   determine a signal characteristic vector of the affected signal;
   determine that the signal characteristic vector is different than a baseline signal characteristic vector;
   wherein the baseline signal characteristic vector is indicative of the location when no user is present at the location;
   determine, based at least in part on the difference, a position of a user within the location;
   receive, with a device, audio data corresponding to a query that includes a speech of the user;
   refine an automatic speech recognition ("ASR") analysis of the audio data based at least in part on the position of the user at the location;
   perform the ASR analysis of the audio data, as refined based at least in part on the position, to determine an action to be performed by one or more devices;
   generate instructions that cause the one or more devices to perform the action; and
   send the instructions to the one or more devices.

6. The apparatus of claim 5, wherein the program instructions that, when executed by the one or more processors, further cause the one or more processors to at least:
   determine that the difference exceeds a threshold.

7. The apparatus of claim 5, wherein the signal characteristic vector is computed as a time offset between a transmission time at which the RF signal is introduced onto the line of the electrical circuit and a receipt time at which the affected signal is received with the receiver.

8. The apparatus of claim 5, wherein the RF signal is introduced on one or more of a positive line of the electrical circuit, a neutral line of the electrical circuit, or a ground line of the electrical circuit.

9. The apparatus of claim 5, further comprising:
   an electrical prong coupled to the RF signal transmitter and configured to be inserted into an electrical outlet of the electrical circuit, wherein the RF signal is introduced onto the electrical circuit through the electrical prong.

10. The apparatus of claim 9, wherein:
    the electrical outlet is within a room of the one or more rooms;
    the RF signal is introduced onto a branch of the electrical circuit corresponding to the room; and
    the position of the user at the location is further determined based at least in part on the branch of the electrical circuit.

11. The apparatus of claim 5, wherein the program instructions that, when executed by the one or more processors, further cause the one or more processors to at least:
    compare a ground line signal measured from a ground line of the electrical circuit by the apparatus with a baseline signal to determine a difference between the ground line signal and the baseline signal.

12. The apparatus of claim 11, wherein the difference between the ground line signal and the baseline signal is indicative of the user physically contacting a second device connected to the electrical circuit or the user being within a defined distance of the second device.

13. The apparatus of claim 12, wherein the program instructions that, when executed by the one or more processors, further cause the one or more processors to at least:
    determine, based at least in part on the difference between the ground line signal and the baseline signal, a device type of the second device.

14. The apparatus of claim 5, wherein the program instructions that, when executed by the one or more processors, further cause the one or more processors to at least:
  determine, based on an input received by the apparatus, an identity of the user.

15. An apparatus, comprising:
  an electrical signal transmitter configured to introduce a signal onto an electrical circuit that provides electricity to one or more rooms of a location such that the signal is emitted from an electrical line of the electrical circuit;
  a receiver that receives an affected signal;
  one or more processors; and
  a memory coupled to the one or more processors, the memory storing program instructions that, when executed by the one or more processors, cause the one or more processors to at least:
    determine a signal characteristic vector representative of the affected signal;
    compare the signal characteristic vector with a stored signal characteristic vector;
    determine, based at least in part on the comparison, a position of a user at the location;
    receive, with a device, audio data that includes a speech of the user;
    refine an automatic speech recognition ("ASR") analysis of the audio data based at least in part on the position of the user at the location;
    perform the ASR analysis of the audio data, as refined based at least in part on the position of the user, to determine an action to be performed by one or more devices:
    generate instructions that cause the one or more devices to perform the action; and
    send the instructions to the one or more devices.

16. The apparatus of claim 15, wherein the program instructions that, when executed by the one or more processors, further cause the one or more processors to at least:
  determine a change in a second signal on at least one of a positive line of the electrical circuit, a neutral line of the electrical circuit, or a ground line of the electrical circuit; and
  wherein the determination of the position of the user at the location is further based at least in part on the change in the second signal.

17. The apparatus of claim 16, wherein the program instructions that, when executed by the one or more processors, further cause the one or more processors to at least:
  determine, based at least in part on the second signal, a device type of a second device contacted by the user or within a distance of the position of the user.

18. The apparatus of claim 16, wherein the program instructions that, when executed by the one or more processors, further cause the one or more processors to at least:
  compare a difference between the second signal and a baseline signal with a stored user signal; and
  determine, based at least in part on the comparison, a user profile corresponding to the stored user signal.

19. The apparatus of claim 15, wherein the signal characteristic vector is computed as a time offset between a transmission time at which the signal is introduced onto the electrical circuit and a receipt time at which the affected signal is received with the receiver.

20. The apparatus of claim 19, wherein the program instructions that, when executed by the one or more processors, further cause the one or more processors to at least:
  determine, based at least in part on the time offset and a frequency of the signal, a distance to an object; and
  wherein the position of the user is further determined based at least in part on the distance and a stored distance for the location.

* * * * *